US009057012B2

(12) United States Patent
Dams et al.

(10) Patent No.: US 9,057,012 B2
(45) Date of Patent: *Jun. 16, 2015

(54) METHOD OF CONTACTING HYDROCARBON-BEARING FORMATIONS WITH FLUORINATED PHOSPHATE AND PHOSPHONATE COMPOSITIONS

(75) Inventors: Rudolf J. Dams, Antwerp (BE); Jimmie R. Baran, Jr., Prescott, WI (US); Yong K. Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 639 days.

This patent is subject to a terminal disclaimer.

(21) Appl. No.: 13/140,313

(22) PCT Filed: Dec. 14, 2009

(86) PCT No.: PCT/US2009/067829
§ 371 (c)(1),
(2), (4) Date: Jun. 16, 2011

(87) PCT Pub. No.: WO2010/080353
PCT Pub. Date: Jul. 15, 2010

(65) Prior Publication Data
US 2011/0247823 A1 Oct. 13, 2011

Related U.S. Application Data

(60) Provisional application No. 61/138,744, filed on Dec. 18, 2008.

(51) Int. Cl.
*C09K 8/584* (2006.01)
*C08F 20/24* (2006.01)
*C09K 8/60* (2006.01)
*C09K 8/80* (2006.01)
*C09K 8/88* (2006.01)

(52) U.S. Cl.
CPC .............. *C09K 8/584* (2013.01); *C08F 20/24* (2013.01); *C09K 8/602* (2013.01); *C09K 8/80* (2013.01); *C09K 8/88* (2013.01)

(58) Field of Classification Search
CPC ................................. C09K 8/602; C09K 8/88
USPC .......................................... 507/205; 526/246
See application file for complete search history.

(56) References Cited

U.S. PATENT DOCUMENTS 2,732,398 A 1/1956 Brice
2,803,615 A 8/1957 Ahlbrecht
(Continued)

FOREIGN PATENT DOCUMENTS

CA 761007 6/1967
CA 2009732 8/1990
(Continued)

OTHER PUBLICATIONS

Adibhatla, "Effect of Surfactants on Wettability of Near-wellbore Regions of Gas Reservoirs", Journal of Petroleum Science and Engineering. 2006, vol. 52, pp. 227-236. (XP002519991).
(Continued)

*Primary Examiner* — Nicole M Buie-Hatcher

(57) ABSTRACT

Method comprising contacting a hydrocarbon-bearing formation with a composition comprising solvent and a fluoropolyether compound. The fluoropolyether compound: is represented by formula $Rf-[C(O)-NR^1-X'-(Z)_m]_n$; or comprises at least one first divalent unit represented by formula (I) and, at least one of, a second divalent unit comprising a pendant Z group; or a monovalent unit comprising a thioether linkage and at least one terminal Z group. Each Rf is independently a fluoropolyether group. Rf is a monovalent or divalent fluoropolyether group, and each Z group is independently $-P(O)(OY)_2$ or $-O-P(O)(OY)_2$. Hydrocarbon-bearing formations treated according to this method are also disclosed.

20 Claims, 3 Drawing Sheets

(56) References Cited

U.S. PATENT DOCUMENTS

| | | |
|---|---|---|
| 3,094,547 A | 6/1963 | Heine |
| 3,274,244 A | 9/1966 | Mackenzie |
| 3,306,855 A | 2/1967 | Borecki |
| 3,311,167 A | 3/1967 | O'Brien |
| 3,394,758 A | 7/1968 | Terry |
| 3,492,374 A | 1/1970 | Le Bleu |
| 3,553,179 A | 1/1971 | Bartlett |
| 3,653,442 A | 4/1972 | Ross |
| 3,901,727 A | 8/1975 | Loudas |
| 3,902,557 A | 9/1975 | Shaughnessy |
| 4,018,689 A | 4/1977 | Thompson |
| 4,200,154 A | 4/1980 | Tate |
| 4,329,236 A | 5/1982 | Alford |
| 4,425,242 A * | 1/1984 | Penny et al. .................. 507/205 |
| 4,432,882 A | 2/1984 | Raynolds et al. |
| 4,440,653 A | 4/1984 | Briscoe et al. |
| 4,460,791 A | 7/1984 | Cooke |
| 4,557,837 A | 12/1985 | Clark |
| 4,565,639 A | 1/1986 | Penny |
| 4,594,200 A | 6/1986 | Penny |
| 4,609,477 A | 9/1986 | Crema |
| 4,624,795 A * | 11/1986 | Dawson et al. ............... 507/205 |
| 4,702,849 A | 10/1987 | Penny |
| 4,753,740 A | 6/1988 | Marlett et al. |
| 4,767,545 A | 8/1988 | Karydas |
| 4,817,715 A | 4/1989 | Peru |
| 4,823,873 A | 4/1989 | Karydas |
| 4,921,619 A | 5/1990 | Karydas |
| 4,923,009 A | 5/1990 | Watkins |
| 4,993,448 A | 2/1991 | Karydas |
| 4,997,580 A | 3/1991 | Karydas |
| 5,032,279 A | 7/1991 | Lee |
| 5,042,580 A | 8/1991 | Cullick |
| 5,092,405 A | 3/1992 | Prukop |
| 5,129,457 A | 7/1992 | Sydansk |
| 5,132,446 A | 7/1992 | Tohzuka |
| 5,186,257 A | 2/1993 | Stahl |
| 5,247,993 A | 9/1993 | Sarem |
| 5,256,318 A | 10/1993 | Masutani |
| 5,270,378 A | 12/1993 | Johnson |
| 5,310,002 A | 5/1994 | Blauch |
| 5,358,052 A | 10/1994 | Gidley |
| 5,414,102 A | 5/1995 | Pohmer |
| 5,424,474 A | 6/1995 | Pohmer |
| 5,550,277 A | 8/1996 | Paciorek |
| 5,691,000 A | 11/1997 | Montagna |
| 5,785,882 A | 7/1998 | Yamamoto |
| 5,929,290 A | 7/1999 | Komiya |
| 6,048,952 A | 4/2000 | Behr |
| 6,165,948 A | 12/2000 | Dewenter |
| 6,182,759 B1 | 2/2001 | Burger |
| 6,184,187 B1 | 2/2001 | Howell |
| 6,206,102 B1 | 3/2001 | Pusch |
| 6,225,263 B1 | 5/2001 | Collins |
| 6,380,149 B2 | 4/2002 | Flynn |
| 6,579,572 B2 | 6/2003 | Espin |
| 6,660,693 B2 | 12/2003 | Miller |
| 6,664,354 B2 | 12/2003 | Savu |
| 6,689,854 B2 | 2/2004 | Fan |
| 6,729,409 B1 | 5/2004 | Gupta et al. |
| 6,824,882 B2 | 11/2004 | Boardman |
| 6,911,417 B2 | 6/2005 | Chan |
| 6,923,921 B2 | 8/2005 | Flynn |
| 6,945,327 B2 | 9/2005 | Ely |
| 6,972,274 B1 | 12/2005 | Slikta |
| 6,995,222 B2 | 2/2006 | Buckanin |
| 7,084,094 B2 | 8/2006 | Gunn |
| 7,094,829 B2 | 8/2006 | Audenaert |
| 7,141,537 B2 | 11/2006 | Audenaert |
| 7,165,613 B2 | 1/2007 | Chan |
| 7,417,099 B2 | 8/2008 | Savu |
| 7,470,741 B2 | 12/2008 | Dams |
| 7,585,817 B2 | 9/2009 | Pope |
| 7,629,298 B2 | 12/2009 | Arco |
| 7,678,426 B2 | 3/2010 | Flynn |
| 7,772,162 B2 | 8/2010 | Pope |
| 7,855,169 B2 | 12/2010 | Pope |
| 8,043,998 B2 | 10/2011 | Pope |
| 8,138,127 B2 | 3/2012 | Pope |
| 8,176,981 B2 | 5/2012 | Savu |
| 8,236,737 B2 | 8/2012 | Fan |
| 8,261,825 B2 | 9/2012 | Pope |
| 8,403,050 B2 | 3/2013 | Pope |
| 8,418,759 B2 | 4/2013 | Moore |
| 8,476,385 B2 * | 7/2013 | Dams et al. ................... 526/246 |
| 2003/0073588 A1 | 4/2003 | Howell |
| 2003/0092581 A1 | 5/2003 | Crews |
| 2004/0048957 A1 | 3/2004 | Medsker |
| 2004/0077775 A1 | 4/2004 | Audenaert |
| 2005/0042553 A1 * | 2/2005 | Lu et al. ........................ 430/322 |
| 2005/0048288 A1 | 3/2005 | Flynn |
| 2005/0124738 A1 | 6/2005 | Sivik |
| 2005/0244641 A1 | 11/2005 | Vincent |
| 2006/0045979 A1 | 3/2006 | Dams |
| 2006/0142518 A1 | 6/2006 | Qiu |
| 2006/0264334 A1 | 11/2006 | Gupta |
| 2007/0015669 A1 | 1/2007 | Zhang |
| 2007/0029085 A1 | 2/2007 | Panga |
| 2007/0123430 A1 * | 5/2007 | Pasquier et al. ............... 507/136 |
| 2007/0197717 A1 | 8/2007 | Ueda |
| 2008/0051300 A1 | 2/2008 | Pope |
| 2009/0149616 A1 | 6/2009 | Audenaert |
| 2009/0281002 A1 | 11/2009 | Casper |
| 2010/0152071 A1 | 6/2010 | Pope |
| 2010/0179262 A1 | 7/2010 | Dams |
| 2010/0181068 A1 | 7/2010 | Pope |
| 2010/0183889 A1 | 7/2010 | Dams |
| 2010/0224361 A1 | 9/2010 | Pope |
| 2010/0270019 A1 | 10/2010 | Pope |
| 2010/0270020 A1 | 10/2010 | Baran, Jr. |
| 2010/0270021 A1 | 10/2010 | Baran, Jr. |
| 2010/0276142 A1 | 11/2010 | Skildum |
| 2011/0056689 A1 | 3/2011 | Baran, Jr. |
| 2011/0124532 A1 | 5/2011 | Maurer |
| 2011/0124782 A1 * | 5/2011 | Dams et al. ................... 524/131 |
| 2011/0136704 A1 | 6/2011 | Sharma |
| 2011/0177983 A1 | 7/2011 | Baran, Jr. |
| 2011/0201531 A1 | 8/2011 | Sharma |
| 2011/0247822 A1 | 10/2011 | Dams |
| 2012/0097393 A1 | 4/2012 | Dams |

FOREIGN PATENT DOCUMENTS

| | | |
|---|---|---|
| EP | 0 603 697 | 9/1997 |
| EP | 0 870 778 | 10/1998 |
| EP | 1 225 178 A1 | 7/2002 |
| EP | 1 311 637 | 5/2003 |
| GB | 2031482 | 4/1980 |
| JP | 60-262870 | 12/1985 |
| JP | 2006 251642 | 9/2006 |
| JP | 2006 276817 | 10/2006 |
| RU | 1706204 | 11/1994 |
| WO | WO 03/089540 | 10/2003 |
| WO | WO 2005-023822 | 3/2005 |
| WO | WO 2005/028589 A1 | 3/2005 |
| WO | WO 2005/035936 A1 | 4/2005 |
| WO | WO 2007011567 A1 * | 1/2007 |
| WO | WO 2007-017806 | 2/2007 |
| WO | WO 2007/033489 | 3/2007 |
| WO | WO 2007/097975 | 8/2007 |
| WO | WO 2008-089391 | 7/2008 |
| WO | WO 2008-154279 | 12/2008 |
| WO | WO 2012-088056 | 6/2012 |
| WO | WO 2012-088216 | 6/2012 |
| WO | WO 2012-125219 | 9/2012 |

OTHER PUBLICATIONS

Al-Anazi et al., "A Successful Methanol Treatment in a Gas-Condensate Reservoir: Field Application", Mar. 2003, SPE 80901, Society of Petroleum Engineers Inc., pp. 1-9.

Clark, H. B., et al., "Use of Fluorochemical Surfactants in Nonaqueous Stimulation Fields," *Journal of Petroleum Chemistry* vol. 32, No. 10 (1980) p. 1695-1697.

Crema et al., "Foaming of Anhydrous Methanol for Well Stimulation", Apr. 1985, SPE 13565, Society of petroleum Engineers Inc., 4 pages.

Fahes, "Wettability Alteration to intermediate Gas-Wetting in Gas-Condensate Reservoirs at High Temperatures", Oct. 9-12, 2005, SPE Annual Technical Conference and Exhibition, Dallas. TX, pp. 1-14. SPE 96184.

Kumar, "Improving the Gas and Condensate Relative Permeability Using Chemical Treatments", May 15-17, 2006, SPE Gas Technology Symposium, Calgary, Alberta, pp. 1-9. SPE 100529.

Li, K. et al., "Experimental Study of Wettabitity Alteration to Preferential Gas-Wetting in Porous Media and Its Effects", SPE Reservoir Eval. And Eng 3 (2), pp. 139-149.

McLeod, "The Use of Alcohol in Gas Well Stimulation", Nov. 10-11, 1966, SPE Eastern Regional Meeting, Columbus, Ohio, pp. 1-13. SPE 1663.

Noh et al., "Experimental Study of Wettability Alteration for Reservoir", Project 3-Gas Condensate Reservoirs Part 2, Reservoir Engineering Research Institute, Apr. 1-Jun. 30, 2Q.05.

Noh et al., "Effect of Wettability on High-Velocity Coefficient in Two-Phase Gas-Liquid Flow", SPE 102773, 2006 SPE Annual Technical Conference and Exhibition held in San Antonio, TX Sep. 24-27, 2006.

Panga, "Preventitive Treatment for Enhancing Water Removal from Gas Reservoirs by Wettability Alteration", Mar. 11-14, 2007, 15th SPE Middle East Oil & Gas Show and Conference, Kingdom of Bahrain, pp. 1-12. SPE 105367.

Pellerite, "Effects of Fluorination on Self-Assembled Monolayer Formation from Alkanephosphonic Acids on Aluminum: Kinetics and Structure," *Journal of Physical Chemistry B*, 2003, vol. 107, No. 42, pp. 11726-11736.

Tang, "Relative Permeability Modification in Gas/Liquid Systems Through Wettability Alteration to Intermediate Gas Wetting", SPE Reservoir Evaluation and Engineering, Dec. 2002, vol. 5, No. 6, pp. 427-436. SPE 81195.

Tonelli, "Linear Perfluoropolyether Difunctional Oligomers: Chemistry, Properties and Applications", J. Fluorine Chem., 1999, vol. 95, pp. 51-70.

International Search Report for PCT/US20009/067829, mailed Aug. 2, 2010, 3 pages.

* cited by examiner

//+ # METHOD OF CONTACTING HYDROCARBON-BEARING FORMATIONS WITH FLUORINATED PHOSPHATE AND PHOSPHONATE COMPOSITIONS

CROSS-REFERENCE TO RELATED APPLICATION

This application is a national stage filing under 35 U.S.C. 371 of PCT/US2009/067829, filed Dec. 14, 2009, which claims priority to U.S. Provisional Patent Application No. 61/138,744, filed Dec. 18, 2008, the disclosure of which is incorporated by reference herein in its entirety.

BACKGROUND

In the oil and gas industry, certain surfactants (including certain fluorinated surfactants) are known as fluid additives for various downhole operations (e.g., fracturing, waterflooding, and drilling). Often, these surfactants function to decrease the surface tension of the fluid or to stabilize foamed fluids.

Some hydrocarbon and fluorochemical compounds have been used to modify the wettability of reservoir rock, which may be useful, for example, to prevent or remedy water blocking (e.g., in oil or gas wells) or liquid hydrocarbon accumulation (e.g., in gas wells) in the vicinity of the wellbore (i.e., the near wellbore region). Water blocking and liquid hydrocarbon accumulation may result from natural phenomena (e.g., water-bearing geological zones or condensate banking) and/or operations conducted on the well (e.g., using aqueous or hydrocarbon fluids). Water blocking and condensate banking in the near wellbore region of a hydrocarbon-bearing geological formation can inhibit or stop production of hydrocarbons from the well and hence are typically not desirable. Not all hydrocarbon and fluorochemical compounds, however, provide the desired wettability modification.

Solvent injection (e.g., injection of methanol) has been used to alleviate the problems of water blocking and condensate banking in gas wells, but this method may provide only a temporary benefit, and may not be desirable under some downhole conditions.

SUMMARY

Fluorinated polymers and methods of treating a hydrocarbon-bearing formation disclosed herein may be useful, for example, for increasing the permeability in hydrocarbon-bearing formations wherein two phases (i.e., a gas phase and an oil phase) of the hydrocarbons are present, (e.g., in gas wells having retrograde condensate and oil wells having black oil or volatile oil). The fluorinated polymers and methods are also typically useful for increasing the permeability in hydrocarbon-bearing formations having brine (e.g., connate brine and/or water blocking) Treatment of a near wellbore region of an oil and/or gas well that has at least one of brine or two phases of hydrocarbons in the near wellbore region may increase the productivity of the well. Although not wishing to be bound by theory, it is believed that the fluorinated polymers generally adsorb to at least one of hydrocarbon-bearing formations or proppants under downhole conditions and modify their wetting properties to facilitate the removal of hydrocarbons and/or brine. The fluorinated polymer may remain on, for example, the rock surface for the duration of an extraction of hydrocarbons from the formation (e.g., 1 week, 2 weeks, 1 month, or longer).

In one aspect, the present disclosure provides a method comprising contacting a hydrocarbon-bearing formation with a composition comprising solvent and a fluoropolyether compound, wherein the fluoropolyether compound:

is represented by formula Rf'—[C(O)—NR$^1$—X'—(Z)$_m$]$_n$; or comprises at least one first divalent unit represented by

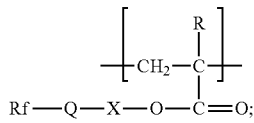

and at least one of
   a second divalent unit comprising a pendant Z group;
   or a monovalent unit comprising a thioether linkage and at least one terminal Z group,
wherein
   each Rf is independently a fluoropolyether group;
   Rf' is a monovalent or divalent fluoropolyether group;
   each Z group is independently —P(O)(OY)$_2$ or —O—P(O)(OY)$_2$;
   each Q is independently a bond, —C(O)—N(R')—, or —C(O)—O—;
   R and R$^1$ are each independently hydrogen or alkyl having up to 4 carbon atoms;
   each X is independently alkylene, arylalkylene, or alkylarylene, wherein alkylene, arylalkylene, and alkylarylene are each optionally interrupted by at least one ether linkage;
   each X' is independently alkylene, arylalkylene, or alkylarylene, wherein alkylene, arylalkylene, and alkylarylene are each optionally interrupted by at least one ester, amide, ether, or amine linkage;
   each Y is independently selected from the group consisting of hydrogen, alkyl, trialkylsilyl, a counter cation, or a bond to the formation; and
   m and n are each independently 1 or 2.

In some of these embodiments, the fluoropolyether compound is represented by formula

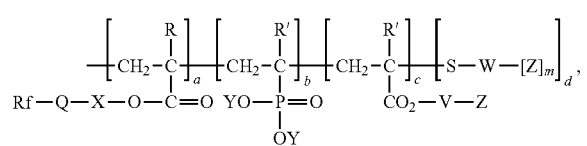

wherein R, Rf, Q, X, Y, and Z are as defined above; R' is independently hydrogen or alkyl having up to 4 carbon atoms, W is a divalent or trivalent linking group selected from the group consisting of alkylene, arylalkylene, and arylene, wherein alkylene is optionally interrupted by at least one ether linkage, ester linkage, or amide linkage; V is alkylene that is optionally interrupted by at least one ether linkage or amine linkage; m is 1 or 2; a is a value from 1 to 100 inclusive; b and c are each independently values from 0 to 100 inclusive; and d is a value from 0 to 1 inclusive, with the proviso that b+c+d is at least 1. Each of the units is independently in random order.

In another aspect, the present disclosure provides a hydrocarbon-bearing formation comprising a surface, wherein at least a portion of the surface is contacted according to a method disclosed herein.

In some embodiments of the foregoing aspects, the hydrocarbon-bearing formation is penetrated by a wellbore, wherein a region near the wellbore is treated with the composition. In some of these embodiments, the method further comprises obtaining (e.g., pumping or producing) hydrocarbons from the wellbore after treating the hydrocarbon-bearing formation with the composition.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list or any combination of two or more items in the list. The phrase "at least one of" followed by a list refers to any one of the items in the list or any combination of two or more items in the list.

The term "brine" refers to water having at least one dissolved electrolyte salt therein (e.g., having any nonzero concentration, and which may be less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "hydrocarbon-bearing formation" includes both hydrocarbon-bearing formations in the field (i.e., subterranean hydrocarbon-bearing formations) and portions of such hydrocarbon-bearing formations (e.g., core samples).

The term "contacting" includes placing a composition within a hydrocarbon-bearing formation using any suitable manner known in the art (e.g., pumping, injecting, pouring, releasing, displacing, spotting, or circulating the composition into a well, well bore, or hydrocarbon-bearing formation).

The term "solvent" refers to a homogeneous liquid material (inclusive of any water with which it may be combined) that is capable of at least partially dissolving the fluoropolyether compound disclosed herein at 25° C.

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

"Alkylene" refers to the divalent form or trivalent form of the "alkyl" groups defined above.

"Arylalkylene" refers to an "alkylene" moiety to which an aryl group is attached.

The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

"Arylene" is the divalent form of the "aryl" groups defined above.

"Alkylarylene" refers to an "arylene" moiety to which an alkyl group is attached.

The phrase "interrupted by at least one functional group", for example, with regard to an alkyl (which may or may not be fluorinated), alkylene, or arylalkylene refers to having part of the alkyl, alkylene, or arylalkylene on both sides of the functional group.

The term "polymer" refers to a molecule having a structure which essentially includes the multiple repetition of units derived, actually or conceptually, from molecules of low relative molecular mass. The term "polymer" encompasses oligomers.

The term "fluoroalkyl group" includes linear, branched, and/or cyclic alkyl groups in which all C—H bonds are replaced by C—F bonds as well as groups in which hydrogen or chlorine atoms are present instead of fluorine atoms provided that up to one atom of either hydrogen or chlorine is present for every two carbon atoms. In some embodiments of fluoroalkyl groups, when at least one hydrogen or chlorine is present, the fluoroalkyl group includes at least one trifluoromethyl group.

The term "productivity" as applied to a well refers to the capacity of a well to produce hydrocarbons (i.e., the ratio of the hydrocarbon flow rate to the pressure drop, where the pressure drop is the difference between the average reservoir pressure and the flowing bottom hole well pressure (i.e., flow per unit of driving force)).

The region near the wellbore (i.e., near wellbore region) includes a region within about 25 feet (in some embodiments, 20, 15, or 10 feet) of the wellbore.

All numerical ranges are inclusive of their endpoints and non-integral values between the endpoints unless otherwise stated.

BRIEF DESCRIPTION OF THE DRAWINGS

For a more complete understanding of the features and advantages of the present disclosure, reference is now made to the detailed description along with the accompanying figures and in which.

DETAILED DESCRIPTION

Figure 1:
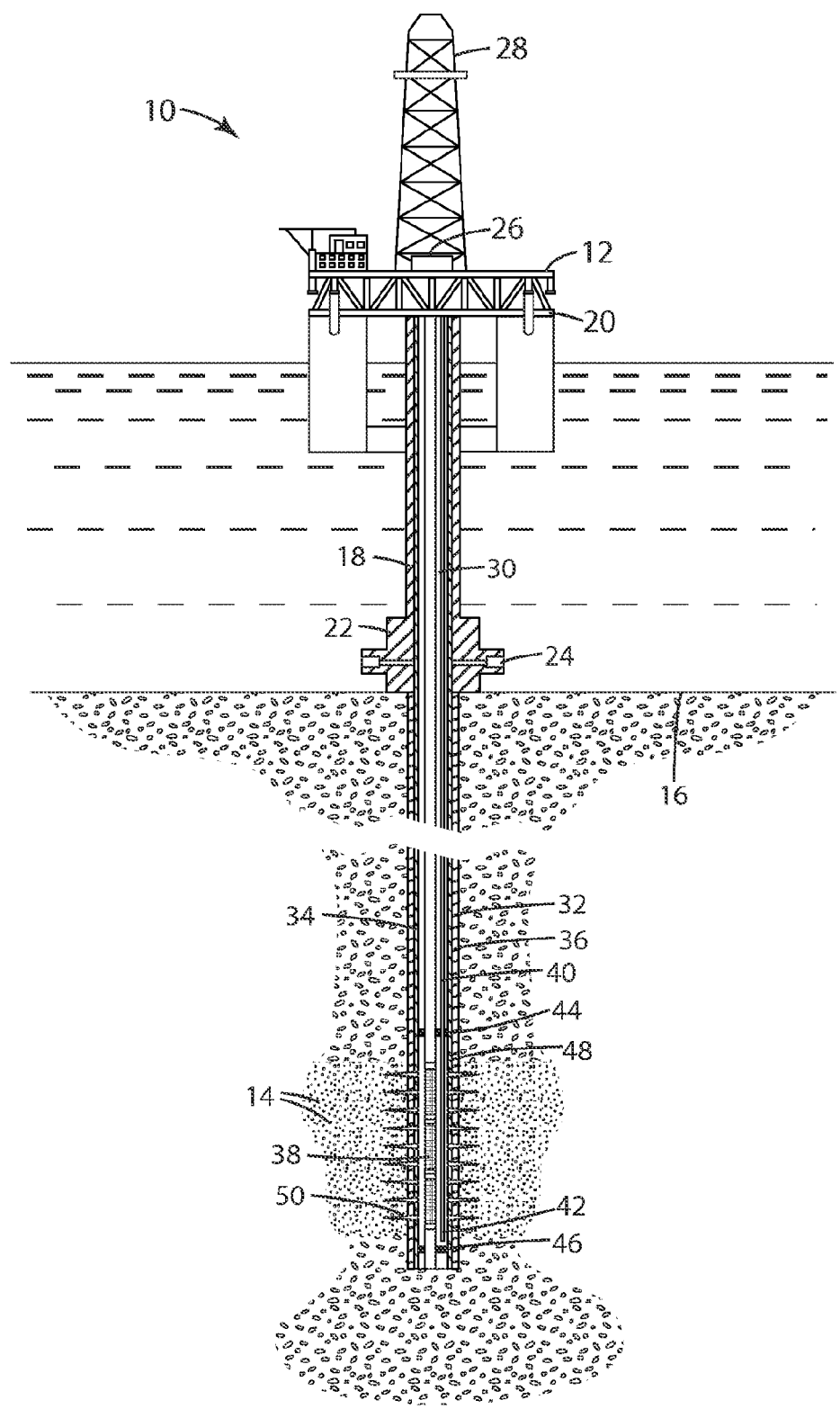
FIG. 1 is a schematic illustration of an exemplary embodiment of an offshore oil platform operating an apparatus for progressively treating a near wellbore region according to some embodiments of the present disclosure.

In some embodiments, fluoropolyether compounds useful for practicing the present disclosure comprise at least one first divalent unit represented by formula I:

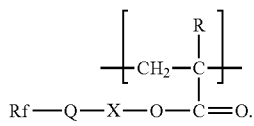

Rf is a fluoropolyether group. The term "fluoropolyether" refers to a compound or group having at least 10 (in some embodiments, at least 11, 12, 13, 14, 15, 16, 17, 18, 19, or even 20) carbon atoms and at least 3 (in some embodiments, at least 4, 5, 6, 7, or even 8) ether linkages, wherein at least some of the hydrogen atoms on the carbon atoms are replaced with fluorine atoms. In some embodiments, Rf has up to 100, 110, 120, 130, 140, 150, or even 160 carbon atoms and up to 25, 30, 35, 40, 45, 50, 55, or even 60 ether linkages.

Compounds comprising a divalent unit represented by Formula I may contain one fluoropolyether group or a mixture of fluoropolyether groups. Typically, the compositions will contain a mixture of fluoropolyether groups.

In some embodiments, the polyfluoropolyether group is a perfluoropolyether group (i.e., all of the hydrogen atoms on the carbon atoms are replaced with fluorine atoms). In some embodiments, Rf is represented by formula $R_f^a$—O—$(R_f^b$—O—$)_{z'}(R_f^c)$—, wherein $R_f^a$ is a perfluoroalkyl having 1 to 10 (in some embodiments, 1 to 6, 1 to 4, 2 to 4, or 3) carbon atoms; each $R_f^b$ is independently a perfluoroalkylene having 1 to 4 (i.e., 1, 2, 3, or 4) carbon atoms; $R_f^c$ is a perfluoroalkylene having 1 to 6 (in some embodiments, 1 to 4 or 2 to 4) carbon atoms; and z' is an integer from 2 to 50 (in some embodiments, 2 to 25, 2 to 20, 3 to 20, 3 to 15, 5 to 15, 6 to 10, or 6 to 8).

Representative $R_f^a$ groups include $CF_3$—, $CF_3CF_2$—, $CF_3CF_2CF_2$—, $CF_3CF(CF_3)$—, $CF_3CF(CF_3)CF_2$—, $CF_3CF_2CF_2CF_2$—, $CF_3CF_2CF(CF_3)$—, $CF_3CF_2CF(CF_3)CF_2$—, and $CF_3CF(CF_3)CF_2CF_2$—. In some embodiments, $R_f^a$ is $CF_3CF_2CF_2$—. Representative $R_f^b$ groups include —$CF_2$—, —$CF(CF_3)$—, —$CF_2CF_2$—, —$CF(CF_3)CF_2$—, —$CF_2CF_2CF_2$—, —$CF(CF_3)CF_2CF_2$—, —$CF_2CF_2CF_2CF_2$—, and —$CF_2C(CF_3)_2$—. Representative $R_f^c$ groups include —$CF_2$—, —$CF(CF_3)$—, —$CF_2CF_2$—, —$CF_2CF_2CF_2$—, and $CF(CF_3)CF_2$—. In some embodiments, $R_f^c$ is —$CF(CF_3)$—.

In some embodiments, $(R_f^b$—O—$)_{z'}$ is represented by —$[CF_2O]_i[CF_2CF_2O]_j$—, —$[CF_2O]_i[CF(CF_3)CF_2O]_j$—, —$[CF_2O]_i[CF_2CF_2CF_2O]_j$—, —$[CF_2CF_2O]_i[CF_2O]_j$—, —$[CF_2CF_2O]_i[CF(CF_3)CF_2O]_j$—, —$[CF_2CF_2O]_i[CF_2CF_2CF_2O]_j$—, —$[CF_2CF_2CF_2O]_i[CF_2CF(CF_3)O]_j$—, and $[CF_2CF_2CF_2O]_i[CF(CF_3)CF_2O]_j$—, wherein i+j is an integer of at least 3 (in some embodiments, at least 4, 5, or 6).

In some embodiments, Rf is selected from the group consisting of $C_3F_7O(CF(CF_3)CF_2O)_nCF(CF_3)$—, $C_3F_7O(CF_2CF_2CF_2O)_nCF_2CF_2$—, and $CF_3O(C_2F_4O)_nCF_2$—, and wherein n' has an average value in a range from 3 to 50 (in some embodiments, 3 to 25, 3 to 15, 3 to 10, 4 to 10, or even 4 to 7). In some of these embodiments, Rf is $C_3F_7O(CF(CF_3)CF_2O)_nCF(CF_3)$—, wherein n has an average value in a range from 4 to 7. In some embodiments, Rf is selected from the group consisting of $CF_3O(CF_2O)_x(C_2F_4O)_yCF_2$— and $F(CF_2)_3$—O—$(C_4F_8O)_{z''}(CF_2)_3$—, wherein x, y, and z" each independently has an average value in a range from 3 to 50 (in some embodiments, 3 to 25, 3 to 15, 3 to 10, or even 4 to 10).

In some embodiments, Rf has a number average molecular weight of at least 500 (in some embodiments at least 750 or even 1000) grams per mole. In some embodiments, Rf has a number average molecular weight of up to 6000 (in some embodiments, 5000 or even 4000) grams per mole. In some embodiments, Rf has a number average molecular weight in a range from 750 grams per mole to 5000 grams per mole.

In divalent units represented by Formula I, Q is selected from the group consisting of a bond, —C(O)—N($R^1$)—, and —C(O)—O—, wherein $R^1$ is hydrogen or alkyl of 1 to 4 carbon atoms (e.g., methyl, ethyl, n-propyl, isopropyl, n-butyl, isobutyl, or sec-butyl). In some embodiments, Q is —C(O)—N($R^1$)—. In some embodiments, $R^1$ is hydrogen or methyl. In some embodiments, $R^1$ is hydrogen. For embodiments of compositions disclosed herein wherein Q is —C(O)—N($R^1$)—, the compositions may be more hydrolytically stable than embodiments wherein Q is —C(O)—O.

In divalent units represented by Formula I, R is hydrogen or alkyl of 1 to 4 carbon atoms (e.g., methyl, ethyl, n-propyl, isopropyl, n-butyl, isobutyl, or sec-butyl). In some embodiments, R is hydrogen or methyl.

In divalent units represented by Formula I, X is selected from the group consisting of alkylene, arylalkylene, and alkylarylene, wherein alkylene, arylalkylene, and alkylarylene are each optionally interrupted by at least one ether linkage. In some embodiments, X is alkylene. In some embodiments, X is ethylene. In some embodiments, X is methylene.

In fluoropolyether compounds useful for practicing the present disclosure, when more than one first divalent unit of Formula I is present, each Rf, Q, R, $R^1$, and X group is independently selected.

In some embodiments, the first divalent unit of Formula I is represented by formula:

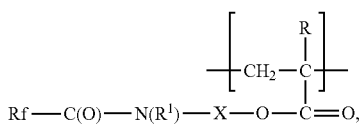

wherein Rf, R, $R^1$, and X are as defined above.

In some embodiments of fluoropolyether compounds disclosed herein that include a first divalent unit represented by Formula I, the fluoropolyether compound further comprises a second divalent unit comprising a pendant Z group, wherein Z is selected from the group consisting of —P(O)(OY)$_2$ and —O—P(O)(OY)$_2$. In some embodiments, Z is —P(O)(OY)$_2$, and in some embodiments, Z is —O—P(O)(OY)$_2$. Each Y is independently selected from the group consisting of hydrogen, alkyl, trialkylsilyl, a counter cation, or a bond to the hydrocarbon-bearing formation. In some embodiments, each Y is hydrogen, and the Z group is a phosphonic acid group or a phosphoric acid group. In some embodiments, at least one Y is alkyl, and the Z group is a phosphate ester or a phosphonate ester. In some embodiments, Y is an alkyl group having 1 to 4 carbon atoms. In some embodiments, at least one Y is a counter cation, and the Z group is a phosphate or phosphonate salt. Exemplary counter cations include alkali metal (e.g., sodium, potassium, and lithium), alkaline earth metal (e.g., calcium or magnesium), ammonium, alkyl ammonium (e.g., tetraalkylammonium), and five to seven membered heterocyclic groups having a positively charged nitrogen atom (e.g., a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion). In some embodiments, at least one Y is trialkylsilyl (in some embodiments trimethylsilyl). Other exemplary trialkylsilyl groups include triethylsilyl, t-butyldimethylsilyl, i-propyldimethylsilyl, phenyldimethylsilyl, and di-t-butylmethylsilyl. In some embodiments (e.g., embodiments of treated hydrocarbon-bearing formations) Y is a bond (e.g., covalent bond, hydrogen bond, or ionic bond) to the hydrocarbon-bearing formation.

In some embodiments, the second divalent unit is represented by formula:

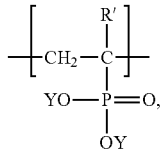

wherein R' is selected from the group consisting of hydrogen and alkyl having from 1 to 4 carbon atoms, and each Y is independently defined as above. In some of these embodiments, Y is hydrogen, and R' is hydrogen.

In some embodiments, the second divalent unit is represented by formula:

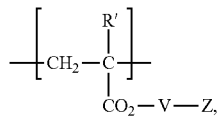

wherein Z is —P(O)(OY)$_2$ or —O—P(O)(OY)$_2$ (in some embodiments —O—P(O)(OY)$_2$), and wherein each Y is independently defined as above. V is alkylene that is optionally interrupted by at least one ether linkage or amine linkage. In some embodiments, V is alkylene having from 2 to 4 (in some embodiments, 2) carbon atoms. R' is selected from the group consisting of hydrogen and alkyl having from 1 to 4 carbon atoms (e.g., methyl, ethyl, n-propyl, isopropyl, n-butyl, isobutyl, or sec-butyl). In some of these embodiments, R' is selected from the group consisting of hydrogen and methyl.

In some embodiments of fluoropolyether compounds disclosed herein that include a first divalent unit represented by Formula I, the fluoropolyether compounds further comprise a monovalent unit comprising a thioether linkage and at least one terminal Z group, wherein Z is selected from the group consisting of —P(O)(OY)$_2$ and —O—P(O)(OY)$_2$. In some of these embodiments, the monovalent unit comprising a thioether linkage and at least one terminal Z group is represented by formula —S—W—[Z]$_{m'}$. W is a divalent or trivalent linking group selected from the group consisting of alkylene, arylalkylene, and arylene, wherein alkylene is optionally interrupted by at least one ether linkage, ester linkage, or amide linkage, and m' is 1 or 2. In some embodiments, W is alkylene (e.g., a linear or branched alkylene) that is interrupted by at least one ester linkage. In some embodiments where a monovalent unit comprising a thioether linkage and at least one terminal Z group is present, typically only one of these monovalent units is present in the composition.

In some embodiments, the monovalent unit comprising a thioether linkage and at least one terminal Z group is represented by a formula selected from the group consisting of:

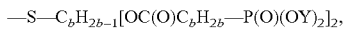

wherein each b is independently an integer from 1 to 5 (in some embodiments, 2 to 3). In some embodiments, the monovalent unit is —S—C$_b$H$_{2b}$OC(O)C$_b$H$_{2b}$—P(O)(OY)$_2$, wherein each b is independently 2 or 3. In some embodiments, the monovalent unit is —S—C$_b$H$_{2b-1}$[OC(O) C$_b$H$_{2b}$—P(O)(OY)$_2$]$_2$, wherein each b is independently 2 or 3.

Fluoropolyether compounds useful for practicing the present disclosure, in some embodiments, may have both a second divalent unit comprising a pendant Z group and a monovalent unit comprising a terminal Z group and/or may have two different second divalent units. In these embodiments, each Z, Y, V, and R' is independently selected.

In some embodiments, fluoropolyether compounds useful for practicing the present disclosure further comprise at least one divalent unit represented by formula:

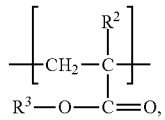

wherein each R$^2$ is independently selected from the group consisting of hydrogen and alkyl having from 1 to 4 carbon atoms (e.g., methyl, ethyl, n-propyl, isopropyl, n-butyl, isobutyl, or sec-butyl), and wherein each R$^3$ is independently alkyl having from 1 to 30 (in some embodiments, 1 to 25, 1 to 20, 1 to 10, 4 to 25, 8 to 25, or even 12 to 25) carbon atoms. In some embodiments, R$^2$ is selected from the group consisting of hydrogen and methyl. In some embodiments, R$^3$ is selected from the group consisting of hexadecyl and octadecyl.

In some embodiments, fluoropolyether compounds useful for practicing the present disclosure further comprise at least one divalent unit represented by formula:

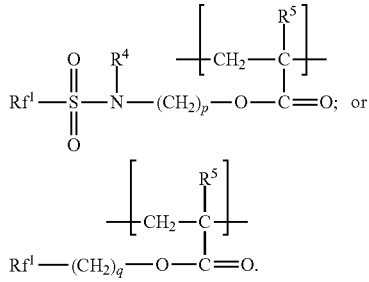

Each Rf$^1$ is independently a fluoroalkyl group having from 3 to 12 (i.e., 3, 4, 5, 6, 7, 8, 9, 10, 11, or 12) carbon atoms. In some embodiments, each Rf$^1$ is independently a perfluoroalkyl group having from 3 to 6 (e.g., perfluoro-n-hexyl, perfluoro-n-pentyl, perfluoroisopentyl, perfluoro-n-butyl, perfluoroisobutyl, perfluoro-sec-butyl, perfluoro-tert-butyl, perfluoro-n-propyl, or perfluoroisopropyl). In some embodiments, Rf$^1$ is perfluorobutyl (e.g., perfluoro-n-butyl). In some embodiments, Rf$^1$ is perfluoropropyl (e.g., perfluoro-n-propyl).

R$^4$ and R$^5$ are each independently hydrogen or alkyl having from 1 to 4 carbon atoms (e.g., methyl, ethyl, n-propyl, isopropyl, n-butyl, isobutyl, or sec-butyl). In some embodiments, R$^4$ is selected from the group consisting of methyl and ethyl. In some embodiments, R$^5$ is selected from the group consisting of hydrogen and methyl.

Each p is independently an integer having a value from 2 to 11 (i.e., 2, 3, 4, 5, 6, 7, 8, 9, 10, or 11).

Each q is independently a value from 1 to 4 (e.g., 1, 2, 3, 4, 5, 6, 7, 8, 9, 10, 11, 12, 13, 14, 15, 16, 17, 18, 19, or 20).

In some embodiments, fluoropolyether compounds useful for practicing the present disclosure comprise a divalent unit represent by Formula I and a divalent unit represent by Formula IIIa:

IIIa

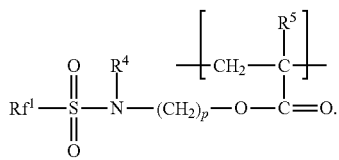

The ratio of divalent units represent by Formula I to divalent units represent by Formula IIIa may be in a range from 99:1 to 1:99 (in some embodiments, 95:5 to 5:95, 90:10 to 10:90, 85:15 to 15:85, 80:20 to 20:80, 75:25 to 25:75, or 90:10 to 50:50). In some embodiments, fluoropolyether compounds useful for practicing the present disclosure comprise a divalent unit represent by Formula IIIa and are free of divalent units represented by Formula I. In some embodiments, the divalent unit represented by Formula IIIa is represented by formula:

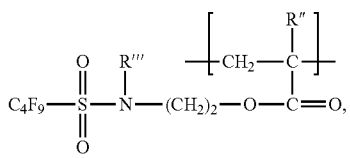

wherein R'' and R''' are each independently hydrogen or alkyl having from 1 to 4 carbon atoms. In some embodiments, each R'' is independently hydrogen or methyl. In some embodiments, R''' is methyl or ethyl. In some embodiments, the fluoropolyether compound comprises a second divalent unit represented by formula:

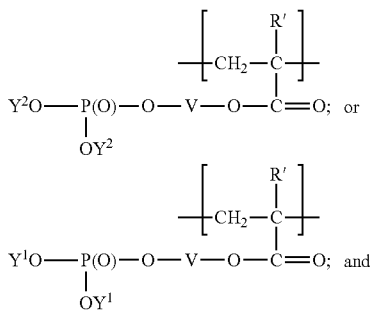

a monovalent unit selected from the group consisting of —S—$C_tH_{2t+1}$ and —S—$C_rH_{2r}$-A. In these embodiments, V is alkylene that is optionally interrupted by at least one ether linkage or amine linkage. In some embodiments, V is alkylene having from 2 to 4 (in some embodiments, 2) carbon atoms. R' selected from the group consisting of hydrogen and alkyl having from 1 to 4 carbon atoms (e.g., methyl, ethyl, n-propyl, isopropyl, n-butyl, isobutyl, or sec-butyl). In some of these embodiments, R' is selected from the group consisting of hydrogen and methyl. t is an integer having a value from 4 to 22 (in some embodiments, 8 to 22, or even 12 to 22). r is an integer having a value from 2 to 10 (in some embodiments, 2 to 6 or even 2 to 4). In some embodiments, A is selected from the group consisting of —OH, —COO$Y^2$, and —SO$_3Y^2$, wherein each $Y^2$ is independently selected from the group consisting of hydrogen, alkyl, and a counter cation (e.g., counter cations described above for the definition of Y). In some embodiments, $Y^2$ is an alkyl group having 1 to 4, 4 to 22, 8 to 22, or 12 to 22 carbon atoms. In some embodiments, $Y^2$ is hydrogen. In some embodiments, A is selected from the group consisting of —OH, —COO$Y^1$, and —SO$_3Y^1$, wherein each $Y^1$ is independently selected from the group consisting of hydrogen, alkyl, a counter cation (e.g., counter cations described above for the definition of Y), and a bond to the hydrocarbon-bearing formation. In some embodiments, $Y^1$ is an alkyl group having 1 to 4, 4 to 22, 8 to 22, or 12 to 22 carbon atoms. In some embodiments, $Y^1$ is hydrogen. In some embodiments, at least one $Y^1$ is a counter cation, wherein the counter cation may have any definition as defined above for Y. In some embodiments, $Y^1$ is a bond (e.g., covalent bond, hydrogen bond, or ionic bond) to the hydrocarbon-bearing formation.

In some embodiments, fluoropolyether compounds useful for practicing the present disclosure that comprise a divalent unit represent by Formula I further comprise at least one divalent unit represented by formula —[$CH_2$—C($Cl_2$)]— or —[$CH_2$—CHCl]—.

In some embodiments, fluoropolyether compounds useful for practicing the present disclosure (e.g., those comprising a divalent unit represented by Formula I) comprise a monovalent unit selected from the group consisting of —S—$C_tH_{2t+1}$ and —S—$C_rH_{2r-(s-1)}$-(A)$_s$, wherein t is an integer having a value from 4 to 22; r is an integer having a value from 2 to 10 (in some embodiments, 2 to 6 or even 2 to 4); s is an integer having a value from 1 to 4; and A is selected from the group consisting of —OH, —COO$Y^2$, and —SO$_3Y^2$, wherein $Y^2$ is selected from the group consisting of hydrogen, alkyl, and a counter cation (e.g., counter cations described above for the definition of Y). In some embodiments, $Y^2$ is alkyl having from 4 to 22, 8 to 22, or 12 to 22 carbon atoms. In some embodiments, compositions according to the present invention comprise a monovalent unit selected from the group consisting of —S—$C_tH_{2t+1}$ and —S—$C_rH_{2r}$-A, wherein t, r, and A are as defined above. In some embodiments, the chain-terminating group is —S—$C_tH_{2t+1}$, wherein t has a value from 4 to 22 (in some embodiments, 8 to 22, or even 12 to 22).

In some embodiments, the first divalent units independently represented by Formula I are present in a range from 25 to 99 (in some embodiments, from 35 to 99, from 50 to 99, from 60 to 98, from 75 to 97, or even from 85 to 97) weight percent, based on the total weight of the fluoropolyether compound.

In some embodiments, the second divalent units are present in a range from 1 to 30 (in some embodiments, from 2 to 30, from 3 to 25, or even from 3 to 15) weight percent, based on the total weight of the fluoropolyether compound.

In some embodiments of fluoropolyether compounds useful for practicing the present disclosure that contain a divalent unit represented by Formula I, the first and second divalent groups and any other divalent units present are randomly connected. These fluoropolyether compounds may be prepared, for example, by reacting a mixture containing at least first and second components typically in the presence of a chain transfer agent and an initiator. By the term "reacting" it is meant forming a composition that includes at least one identifiable structural element due to each of the first and second components. Depending on the stoichiometry of the reaction, an oligomer or polymer may be formed. Typically the polymer or oligomer has a distribution of molecular weights and compositions.

In some embodiments, the first component is represented by Formula II:

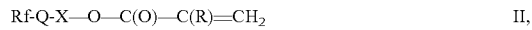

wherein Rf, Q, R, and X are as defined above for a divalent unit of Formula I. In some embodiments, the compound of Formula II is Rf—C(O)—N($R^1$)—X—O—C(O)—C(R)=CH$_2$, wherein $R^1$ is as defined above for a compound of Formula I.

In some embodiments, the second component comprises at least one polymerizable double bond and at least one of a —P(O)(OY)$_2$ or —O—P(O)(OY)$_2$ group, wherein each Y is independently selected from the group consisting of hydrogen, alkyl, trialkylsilyl, and a counter cation. In some embodiments, the second component is at least one of $(YO)_2$—P(O)—C(R')=CH$_2$ or $(YO)_2$—P(O)—O—V—O—C(O)—C(R')=CH$_2$;

wherein each R' is independently selected from the group consisting of hydrogen and alkyl having from 1 to 4 carbon atoms, and each V is independently alkylene that is optionally interrupted by at least one ether linkage or amine linkage. In some embodiments, V is alkylene having from 2 to 4 (in some embodiments, 2) carbon atoms. In some embodiments, R' is selected from the group consisting of hydrogen and methyl. Some second components of these formulas are available, for example, from commercial sources (e.g., vinylphosphonic acid and ethylene glycol methacrylate phosphate) or can be prepared using known synthetic methods. In some embodiments, the second component is a double-bond containing phosphate available from Uniqema, New Castle, Del., under the trade designations "MAXEMUL 6106" and "MAXEMUL 6112".

In some embodiments, mixtures of more than one first component of Formula II and/or more than one second component of formula $(YO)_2$—P(O)—C(R')=CH$_2$ or $(YO)_2$—P(O)—O—V—O—C(O)—C(R')=CH$_2$ can be used. In other embodiments, one first component of Formula II and one second component of formula $(YO)_2$—P(O)—C(R')=CH$_2$ or $(YO)_2$—P(O)—O—V—O—C(O)—C(R')=CH$_2$ can be used.

The component represented by Formula II can be prepared, for example, using known methods. For example, hexafluoropropylene oxide can be polymerized using known methods to form a perfluoropolyether terminated with a fluorocarbonyl group (i.e., —C(O)F). This material can be vacuum distilled to remove components having a molecular weight less than 500 (in some embodiments, in some embodiments, less than 600, 700, 750, 800, 900, or even 1000) grams per mole. The fluorocarbonyl group can optionally be converted to a carboxy or alkoxycarbonyl group by conventional methods. Typically, conversion to an alkoxycarbonyl terminated perfluoropolyether (e.g., conversion to a methyl ester of formula Rf—C(O)—OCH$_3$) is carried out.

A methyl ester of formula Rf—C(O)—OCH$_3$, an acid fluoride of formula Rf—C(O)—F, or a carboxylic acid of formula Rf—C(O)—OH can then be converted to a compound of Formula II using a number of conventional methods. For example, a fluoropolyether monomer of formula Rf—(CO)NHCH$_2$CH$_2$O(CO)C(R)=CH$_2$ can be prepared by first reacting Rf—C(O)—OCH$_3$, for example, with ethanolamine to prepare alcohol-terminated Rf—(CO)NHCH$_2$CH$_2$OH, which can then be reacted with methacrylic acid, methacrylic anhydride, acrylic acid or acryloyl chloride to prepare the compound of Formula II, wherein R is methyl or hydrogen, respectively. Other amino alcohols (e.g., amino alcohols of formula NR$^1$HXOH) can be used in this reaction sequence to provide compounds of Formula II, wherein Q is —C(O)—N(R$^1$)—, and R$^1$ and X are as defined above. In further examples, an ester of formula Rf—C(O)—OCH$_3$ or a carboxylic acid of formula Rf—C(O)—OH can be reduced using conventional methods (e.g., hydride, for example sodium borohydride, reduction) to an alcohol of formula Rf—CH$_2$OH. The alcohol of formula Rf—CH$_2$OH can then be reacted with methacryloyl chloride, for example, to provide a perfluoropolyether monomer of formula Rf—CH$_2$O(CO)C(R)=CH$_2$. Examples of suitable reactions and reagents are further disclosed, for example, in the European patent EP 870 778 A1, published Oct. 14, 1998, and U.S. Pat. No. 3,553,179 (Bartlett et al.), the disclosures of which, relating to reagents and reaction conditions for preparing compounds of Formula II, are incorporated herein by reference.

The reaction of at least one first component and at least one second component is typically carried out in the presence of an added free-radical initiator. Free radical initiators such as those widely known and used in the art may be used to initiate polymerization of the components. Exemplary free-radical initiators are described in U.S. Pat. No. 6,995,222 (Buckanin et al.), the disclosure of which is incorporated herein by reference.

In some embodiments, the reaction of a component of Formula II and a component of at least one of formula $(YO)_2$—P(O)—C(R')=CH$_2$ or $(YO)_2$—P(O)—O—V—O—C(O)—C(R')=CH$_2$ may be carried out in solvent. The components may be present in the reaction medium at any suitable concentration, (e.g., from about 5 percent to about 80 percent by weight based on the total weight of the reaction mixture). Illustrative examples of suitable solvents include ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "HFE-7100" and "HFE-7200"), and mixtures thereof.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or even from about 50° C. to about 80° C.).

Free-radical polymerizations may be carried out in the presence of chain transfer agents. Typical chain transfer agents that may be used in the preparation of compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan). The chain-transfer agent typically becomes the monovalent unit in fluoropolyether compounds containing a divalent unit represented by Formula I. In some embodiments, the chain-transfer agent is an aliphatic mercaptan, and the monovalent unit is represented by formula —S—C$_t$H$_{2t+1}$, wherein t is an integer from 4 to 22 (in some embodiments, 8 to 22 or even 12 to 22). In some embodiments, the chain-transfer agent is a hydroxyl-substituted mercaptan, and the monovalent unit is represented by formula —S—W—[OH]$_m$, wherein W and m are as defined above. When the monovalent unit is —S—W—[OH]$_m$, it may be converted into a monovalent unit of formula —S—W—[Z]$_m$ using conventional methods. For example, at least one hydroxyl group in —S—W—[OH]$_m$ can be reacted with 2-phosphonoacetic acid or 3-phosphonopropionic at an elevated temperature. The reaction can be carried out, for example, in a suitable solvent (e.g., a ketone or an ether) in the presence of a catalyst (e.g., methanesulfonic acid). Depending on the starting composition and the reaction stoichiometry, the resultant monovalent unit may be represented by at least one of —S—$C_bH_{2b}$OC(O)$C_bH_{2b}$—P(O)(OY)$_2$, —S—$C_bH_{2b-1}$[OC(O)$C_bH_{2b}$—P(O)(OY)$_2$]$_2$, or —S—$C_bH_{2b-1}$(OH)[OC(O)$C_bH_{2b}$—P(O)(OY)$_2$], wherein b is as defined above.

Adjusting, for example, the concentration and activity of the initiator, the concentration of each of the first component of Formula II, the second component (in some embodiments), the temperature, the concentration of the chain transfer agent, and the solvent using techniques known in the art can control the molecular weight of a polyacrylate copolymer.

In some embodiments of the reaction of a first component of Formula II and a second component of at least one of formula (YO)$_2$—P(O)—C(R')=CH$_2$ or (YO)$_2$—P(O)—O—V—O—C(O)—C(R')=CH$_2$, Y is trialkylsilyl. In these embodiments, a trialkylsilyl chloride (e.g., trimethylsilyl chloride, triethylsilyl chloride, t-butyldimethylsilyl chloride, and isopropyldimethylsilyl chloride) is combined with the first and second components, the solvent, initiator, and the chain transfer agent. At the end of the reaction, the reaction mixture can be combined with water to provide a composition according to the present invention having a Z group in which Y is hydrogen. Alternatively, the reaction mixture can be combined with water containing, for example, ammonium hydroxide, sodium hydroxide, or potassium hydroxide to provide a composition having a Z group in which Y is a counter cation (e.g., ammonium, sodium, or potassium). Optionally, the reaction solvent can be removed under reduced pressure using conventional techniques.

Fluoropolyether compounds useful for practicing the present disclosure that contain a first divalent unit represented by Formula I can be prepared in a medium comprising water. In these embodiments, typically a cosolvent is used. Suitable cosolvents include ethers (e.g., tetrahydrofuran, tert-butyl methyl ether), alcohols (e.g., ethanol and isopropanol), and ketones (e.g., methyl ethyl ketone and methyl isobutyl ketone). In some embodiments, the reaction is carried out in the presence of an anionic surfactant as an emulsifier (e.g., sodium dodecyl benzene sulfonate, sodium lauryl sulfate, sodium laureth sulfate, sodium dioctylsulfosuccinate, and reactive emulsifiers available, for example, from Uniqema under the trade designations "MAXEMUL 6106" and "MAXEMUL 6112".

In some embodiments, fluoropolyether compounds useful for practicing the present disclosure that contain a first divalent unit represented by Formula I can be made by reacting at least one first component of Formula II and at least one second component comprising a functional group that can be converted into a Z group (i.e., —P(O)(OY)$_2$ or —O—P(O)(OY)$_2$, wherein Y is as defined above.) For example, the second component may be represented by formula HO—V—O—C(O)—C(R')=CH$_2$, wherein R' and V are as defined above. The reaction product of the first component of Formula II and the second component HO—V—O—C(O)—C(R')=CH$_2$ comprises a divalent unit of formula:

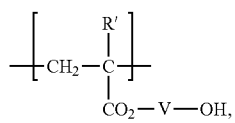

which has a hydroxyl group that may be converted, for example, into —O—P(O)(OY)$_2$ using conventional methods (e.g., reaction with pyrophosphoric acid or POCl$_3$ at an elevated temperature).

To prepare some fluoropolyether compounds that contain a first divalent unit represented by Formula I useful for practicing the present disclosure other components (e.g., monomers) may be included. In some embodiments, an acrylate or methacrylate monomer represented by Formula III:

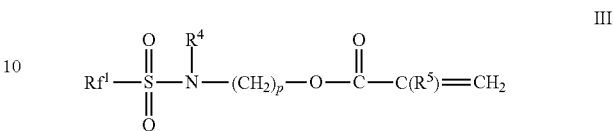

is added, wherein Rf$^1$, R$^4$, R$^5$, and p are as defined above. In some embodiments an acrylate or methacrylate represented by Formula IV:

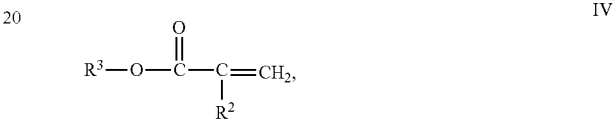

is added, wherein R$^2$ and R$^3$ are as defined above. In some embodiments, vinylidene chloride or vinyl chloride is added. In some embodiments, an acrylate or methacrylate of formula

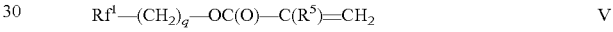

is added, wherein Rf$^1$, q, and R$^5$ are as defined above.

Fluorinated free-radically polymerizable acrylate monomers of formula III, and methods for their preparation, are known in the art; (see, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference). Methods described for making nonafluorobutanesulfonamido group-containing structures described in U.S. Pat. No. 6,664,354 can be used to make heptafluoropropanesulfonamido groups by starting with heptafluoropropanesulfonyl fluoride, which can be made, for example, by the methods described in Examples 2 and 3 of U.S. Pat. No. 2,732,398 (Brice et al.), the disclosure of which is incorporated herein by reference. Methods for making compounds of Formula V are known; (see, e.g., EP1311637 B1, published Apr. 5, 2006, and incorporated herein by reference for the disclosure of the preparation of 2,2,3,3,4,4,4-heptafluorobutyl 2-methylacrylate). Other compounds of Formula V are available, for example, from commercial sources (e.g., 3,3,4,4,5,5,6,6,6-nonafluorohexyl acrylate from Daikin Chemical Sales, Osaka, Japan and 3,3,4,4,5,5,6,6,6-nonafluorohexyl 2-methylacrylate from Indofine Chemical Co., Hillsborough, N.J.).

Compounds of formula IV (e.g., methyl methacrylate, butyl acrylate, hexadecyl methacrylate, octadecyl methacrylate, stearyl acrylate, behenyl methacrylate) are available, for example, from several chemical suppliers (e.g., Sigma-Aldrich Company, St. Louis, Mo.; VWR International, West Chester, Pa.; Monomer-Polymer & Dajac Labs, Festerville, Pa.; Avocado Organics, Ward Hill, Mass.; and Ciba Specialty Chemicals, Basel, Switzerland) or may be synthesized by conventional methods. Some compounds of formula IV are available as single isomers (e.g., straight-chain isomer) of single compounds. Other compounds of formula IV are available, for example, as mixtures of isomers (e.g., straight-chain and branched isomers), mixtures of compounds (e.g., hexadecyl acrylate and octadecylacrylate), and combinations thereof.

Other acrylates may also be added, for example, silicone acrylates available, for example, from Shin-Etsu Silicones of America, Inc., Akron, Ohio, under the trade designation "X22-2426", and urethane acrylates available, for example, from Sartomer Company, Exton, Pa. under the trade designation "CN966J75".

In some embodiments, fluoropolyether compounds useful for practicing the present disclosure are represented by formula Rf'—[C(O)—NR$^1$—X'—(Z)$_m$]$_n$. For compounds represented by formula Rf'—[C(O)—NR$^1$—X'—(Z)$_m$]$_n$, Rf' is a fluoropolyether group that is defined as in any of the above embodiments of Rf, and R$^1$ is as defined in any of the above embodiments of R$^1$.

In fluoropolyether compounds represented by formula Rf'—[C(O)—NR$^1$—X'—(Z)$_m$]$_n$, each X' is independently divalent or trivalent alkylene, arylalkylene, or alkylarylene, wherein alkylene, arylalkylene, and alkylarylene are each optionally interrupted by at least one ester, amide, ether, or amine linkage. In some embodiments, X' is phenylene group connected to an alkylene group where the alkylene group has up to 6 carbon atoms. In some embodiments, X' is an alkylene group having up to 6 carbon atoms that is unsubstituted or substituted by a phenyl group.

In fluoropolyether compounds represented by formula Rf'—[C(O)—NR$^1$—X'—(Z)$_m$]$_n$, Z is —P(O)(OY)$_2$ or —O—P(O)(OY)$_2$. In some embodiments, Z is —P(O)(OY)$_2$, and in some embodiments, Z is —O—P(O)(OY)$_2$. In these embodiments, Y is as defined in any of the above embodiments of Y.

In some embodiments, fluoropolyether compounds useful for practicing the present disclosure are represented by formula Rf'—{C(O)—N(R$^1$)—X"—[OC(O)—V'—P(O)—(OY)$_2$]$_y$}$_z$. In these embodiments, Rf' is a fluoropolyether group that is defined as in any of the above embodiments of Rf, and Y and R$^1$ is as defined in any of the above embodiments of Y and R$^1$. In Formula Rf'—{C(O)—N(R$^1$)—X"—[OC(O)—V'—P(O)—(OY)$_2$]$_y$}$_z$, X" is a divalent or trivalent group selected from the group consisting of alkylene, arylalkylene, and alkylarylene, wherein alkylene, arylalkylene, and alkylarylene are each optionally interrupted by at least one ether linkage (i.e., —O—). In some embodiments, X" is alkylene. In some embodiments, X" is ethylene. In some embodiments, X" is methylene. In some embodiments, X" is a divalent alkylene group, and y is 1. In some embodiments, X" is a trivalent alkylene group, and y is 2.

In Formula Rf'—{C(O)—N(R$^1$)—X"—[OC(O)—V'—P(O)—(OY)$_2$]$_y$}$_z$, V' is alkylene that is optionally interrupted by at least one ether linkage (i.e., —O—) or amine (i.e., —N(R$^1$)—, wherein R$^1$ is as defined above) linkage. In some embodiments, V' is alkylene having from 2 to 4 (i.e., 2, 3, or 4) (in some embodiments, 2) carbon atoms.

In compounds represented by formula Rf'—[C(O)—NR$^1$—X'—(Z)$_m$]$_n$, when at least one of m or n is 2, and in compounds represented by formula Rf'—{C(O)—N(R$^1$)—X"—[OC(O)—V'—P(O)—(OY)$_2$]$_y$}$_z$, when at least one of y or z is 2, each Rf', R$^1$, X", X', and V' group is independently selected.

The compounds represented by Formula Rf'—[C(O)—NR$^1$—X'—(Z)$_m$]$_n$ and Rf'—{C(O)—N(R)—X"—[OC(O)—V'—P(O)—(OY)$_2$]$_y$}$_z$ can be prepared, for example, from a perfluoropolyether methyl ester of formula Rf'—[C(O)—OCH$_3$]$_z$, wherein z is 1 or 2. Monovalent methyl esters of this formula can be prepared, for example, by polymerization of hexafluoropropylene oxide using known methods to form a perfluoropolyether terminated with a fluorocarbonyl group (i.e., —C(O)F). This material can be vacuum distilled to remove components having a molecular weight less than 500 (in some embodiments, less than 600, 700, 750, 800, 900, or even 1000) grams per mole. The fluorocarbonyl group can be converted to a alkoxycarbonyl group (e.g., a methyl ester) by conventional methods, for example, by esterification with methanol. Divalent methyl esters of formula Rf'—[C(O)—OCH$_3$]$_z$ can be prepared, for example, by known methods or can be obtained commercially (e.g., from Solvay Solexis, Houston, Tex., available under the trade designation "FOMBLIN ZDEAL").

Methyl esters of formula Rf'—[C(O)—OCH$_3$]$_z$ can then be reacted, for example, with an amino alcohol of Formula NHR$^1$—X"—(OH)$_y$, wherein R$^1$, X", and y are as defined above, using methods described on column 16, lines 37-62 of U.S. Pat. No. 7,094,829 (Audenaert et al.), the disclosure of which method is incorporated herein by reference, to provide an alcohol of formula Rf'—[C(O)—NHR$^1$—X"—(OH)$_y$]$_z$. Many amino alcohols are available commercially. In some embodiments, the amino alcohol is ethanol amine. In some embodiments, the amino alcohol is 3-amino-1,2-propanediol.

Alcohols of formula Rf'—[C(O)—NHR$^1$—X"—(OH)$_y$]$_z$ can be reacted, for example, with a phosphono carboxylic acid, or an ester or a salt thereof, of formula HOOC—V'—P(O)—(OY)$_2$, wherein V' and Y as are defined above, under esterification conditions to provide a compound of Formula Rf'—{C(O)—N(R)—X—[OC(O)—V—P(O)—(OY)$_2$]$_y$}$_z$. In some embodiments, the phosphono carboxylic acid is 2-phosphonoacetic acid or 3-phosphonopropionic acid. The reaction may be carried out, for example, at an elevated temperature, in a suitable solvent (e.g., a ketone or an ether), optionally in the presence of a catalyst (e.g., methanesulfonic acid).

Other fluoropolyether compounds represented by formula Rf'—[C(O)—NR$^1$—X'—(Z)$_m$]$_n$ can be prepared, for example, according to the examples of U.S. Pat. App. Pub. No. 2005/0048288 (Flynn et al.), the disclosure of which is incorporated herein by reference.

Typically, in compositions useful for practicing the methods described herein, the fluoropolyether compound is present in the treatment composition at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or 10 percent by weight, based on the total weight of the treatment composition. For example, the amount of the fluoropolyether compound in the compositions may be in a range of from 0.01 to 10, 0.1 to 10, 0.1 to 5, 1 to 10, or even in a range from 1 to 5 percent by weight, based on the total weight of the composition. Lower and higher amounts of the fluoropolyether compound in the compositions may also be used, and may be desirable for some applications.

Compositions useful for practicing the methods disclosed herein comprise at least one solvent. Examples of useful solvents for any of these methods include organic solvents, water, easily gasified fluids (e.g., ammonia, low molecular weight hydrocarbons, and supercritical or liquid carbon dioxide), and combinations thereof. In some embodiments, the compositions are essentially free of water (i.e., contains less than 0.1 percent by weight of water based on the total weight of the composition). In some embodiments, the solvent is a water-miscible solvent (i.e., the solvent is soluble in water in all proportions). Examples of organic solvents include polar and/or water-miscible solvents, for example, monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or poly (propylene glycol)), triols (e.g., glycerol, trimethylolpropane), or pentaerythritol; ethers such as diethyl ether, methyl t-butyl ether, tetrahydrofuran, p-dioxane, or polyol ethers (e.g., glycol ethers (e.g., ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.)); ketones (e.g., acetone or 2-butanone); and combinations thereof.

In some embodiments of the methods disclosed herein, the solvent comprises at least one of a hydrofluorocarbon or hydrofluoroether. Useful hydrofluoroethers may be represented by the general formula $Rf^3-[O-R_h]_a$, wherein a is an integer from 1 to 3; $Rf^3$ is a perfluoroalkyl or di- or trivalent perfluoroalkylene, each of which may be interrupted with at least one —O—; and $R_h$ is an alkyl group optionally interrupted with at least one —O—. Numerous hydrofluoroethers of this type are disclosed in U.S. Pat. No. 6,380,149 (Flynn et al.), the disclosure of which is incorporated herein by reference. In some embodiments, the hydrofluoroether is methyl perfluorobutyl ether or ethyl perfluorobutyl ether. Useful hydrofluoroethers also include hydrofluoroethers available, for example, from 3M Company, St. Paul, Minn., under the trade designations "HFE-7100" and "HFE-7200".

In some embodiments of the methods disclosed herein, the solvent comprises at least one of a polyol or polyol ether independently having from 2 to 25 (in some embodiments, 2 to 15, 2 to 10, 2 to 9, or 2 to 8) carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 25, 2 to 20, 2 to 15, 2 to 10, 2 to 8, or 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 8, or from 5 to 8 carbon atoms. In some embodiments, the polyol is at least one of ethylene glycol, propylene glycol, poly(propylene glycol), 1,3-propanediol, or 1,8-octanediol, and the polyol ether is at least one of 2-butoxyethanol, diethylene glycol monomethyl ether, ethylene glycol monobutyl ether, dipropylene glycol monomethyl ether, or 1-methoxy-2-propanol. In some embodiments, the polyol and/or polyol ether has a normal boiling point of less than 450° F. (232° C.), which may be useful, for example, to facilitate removal of the polyol and/or polyol ether from a well after treatment. In some embodiments, the solvent comprises at least one of 2-butoxyethanol, ethylene glycol, propylene glycol, poly (propylene glycol), 1,3-propanediol, 1,8-octanediol, diethylene glycol monomethyl ether, ethylene glycol monobutyl ether, or dipropylene glycol monomethyl ether.

In some embodiments of the methods disclosed herein, the solvent comprises at least one of water, a monohydroxy alcohol, an ether, or a ketone, wherein the monohydroxy alcohol, the ether, and the ketone each independently have up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing the methods disclosed herein comprise at least one of methanol, ethanol, isopropanol, tetrahydrofuran, or acetone.

In some embodiments of the methods disclosed herein, the compositions comprise at least two organic solvents. In some embodiments, the solvent comprises at least one of a polyol or polyol ether independently having from 2 to 25 (in some embodiments, 2 to 15, 2 to 10, 2 to 9, or 2 to 8) carbon atoms and at least one of water, a monohydroxy alcohol, an ether, or a ketone, wherein the monohydroxy alcohol, the ether, and the ketone each independently have up to 4 carbon atoms. In these embodiments, in the event that a component of the solvent is a member of two functional classes, it may be used as either class but not both. For example, ethylene glycol monomethyl ether may be a polyol ether or a monohydroxy alcohol, but not as both simultaneously. In these embodiments, each solvent component may be present as a single component or a mixture of components. In some embodiments, compositions useful for practicing any of the methods disclosed herein comprise at least one of a polyol or polyol ether independently having from 2 to 25 (in some embodiments, 2 to 15, 2 to 10, 2 to 9, or 2 to 8) carbon atoms and at least one monohydroxy alcohol having up to 4 carbon atoms.

For any of the embodiments of the methods disclosed herein, wherein the compositions comprise at least one of a polyol or polyol ether independently having from 2 to 25 (in some embodiments, 2 to 15, 2 to 10, 2 to 9, or 2 to 8) carbon atoms, the polyol or polyol ether is present in the composition at least 50, 55, 60, or 65 percent by weight and up to 75, 80, 85, or 90 percent by weight, based on the total weight of the composition. Exemplary solvent combinations that contain at least one of a polyol or polyol ether include 1,3-propanediol (80%)/isopropanol (IPA) (20%), propylene glycol (70%)/IPA (30%), propylene glycol (90%)/IPA (10%), propylene glycol (80%)/IPA (20%), ethylene glycol (50%)/ethanol (50%), ethylene glycol (70%)/ethanol (30%), propylene glycol monobutyl ether (PGBE) (50%)/ethanol (50%), PGBE (70%)/ethanol (30%), dipropylene glycol monomethyl ether (DPGME) (50%)/ethanol (50%), DPGME (70%)/ethanol (30%), diethylene glycol monomethyl ether (DEGME) (70%)/ethanol (30%), triethylene glycol monomethyl ether (TEGME) (50%)/ethanol (50%), TEGME (70%)/ethanol (30%), 1,8-octanediol (50%)/ethanol (50%), propylene glycol (70%)/tetrahydrofuran (THF) (30%), propylene glycol (70%)/acetone (30%), propylene glycol (70%), methanol (30%), propylene glycol (60%)/IPA (40%), 2-butoxyethanol (80%)/ethanol (20%), 2-butoxyethanol (70%)/ethanol (30%), 2-butoxyethanol (60%)/ethanol (40%), propylene glycol (70%)/ethanol (30%), ethylene glycol (70%)/IPA (30%), and glycerol (70%)/IPA (30%), wherein the exemplary percentages are by weight are based on the total weight of solvent. In some embodiments of the methods disclosed herein, the solvent comprises up to 95, 90, 80, 70, 60, 50, 40, 30, 20, or 10 percent by weight of a monohydroxy alcohol having up to 4 carbon atoms, based on the total weight of the composition.

The amount of solvent typically varies inversely with the amount of other components in compositions useful for practicing the present disclosure. For example, based on the total weight of the composition the solvent may be present in the composition in an amount of from at least 10, 20, 30, 40, or 50 percent by weight or more up to 60, 70, 80, 90, 95, 98, or 99 percent by weight, or more.

The ingredients for compositions described herein including fluoropolyether compounds and solvent can be combined using techniques known in the art for combining these types of materials, including using conventional magnetic stir bars or mechanical mixer (e.g., in-line static mixer and recirculating pump).

Although not wishing to be bound by theory, it is believed that treatment methods according to the present disclosure will provide more desirable results when the composition is homogenous at the temperature(s) encountered in the hydrocarbon-bearing formation. Whether the composition is homogeneous at the temperature can depend on many variables (e.g., concentration of the fluoropolyether compound, solvent composition, brine concentration and composition, hydrocarbon concentration and composition, and the presence of other components (e.g., surfactants)). It is believed that once the composition contacts a hydrocarbon-bearing formation (e.g., downhole), the fluoropolyether compound will adsorb out of solution onto at least one of the formation or at least a portion of a plurality of proppants located in a fracture in the formation. Once adsorbed onto the formation or at least a portion of a plurality of proppants, the fluoropolyether compound can modify the wetting properties of the formation and cause an increase in at least one of the gas or oil permeabilities in the formation. It is believed that low-foaming fluoropolyether compounds and compositions are more effective for increasing the gas permeability of hydrocarbon-bearing formations.

In some embodiments of methods and treated hydrocarbon-bearing formations disclosed herein, the hydrocarbon-bearing formation has brine. The brine present in the formation may be from a variety of sources including at least one of connate water, flowing water, mobile water, immobile water, residual water from a fracturing operation or from other downhole fluids, or crossflow water (e.g., water from adjacent perforated formations or adjacent layers in the formations). The brine may cause water blocking in the hydrocarbon-bearing formation prior to treatment. In some embodiments of the compositions, the solvent at least partially solubilizes or at least partially displaces brine in the hydrocarbon-bearing formation. In some embodiments, the brine has at least 2, 3, 4, 5, 6, 7, 8, 9, or even at least 10 weight percent dissolved salts (e.g., sodium chloride, calcium chloride, strontium chloride, magnesium chloride, potassium chloride, ferric chloride, ferrous chloride, and hydrates thereof), based on the total weight of the brine. Although not wanting to be bound by theory, it is believed that the effectiveness of the methods disclosed herein for improving hydrocarbon productivity of a particular oil and/or gas well having brine accumulated in the near wellbore region will typically be determined by the ability of the composition to dissolve or displace the quantity of brine present in the near wellbore region of the well without causing precipitation of the fluoropolyether compound or salts. Hence, at a given temperature greater amounts of treatment compositions having lower brine solubility (i.e., compositions that can dissolve a relatively lower amount of brine) will typically be needed than in the case of compositions having higher brine solubility and containing the same fluoropolyether compound at the same concentration.

In some embodiments of the methods disclosed herein, when the composition treats the hydrocarbon-bearing formation, the hydrocarbon-bearing formation is substantially free of precipitated salt. As used herein, the term "substantially free of precipitated salt" refers to an amount of salt that does not interfere with the ability of the fluorinated ether composition to increase the gas permeability of the hydrocarbon-bearing formation. In some embodiments, "substantially free of precipitated salt" means that no precipitate is visually observed. In some embodiments, "substantially free of precipitated salt" is an amount of salt that is less than 5% by weight higher than the solubility product at a given temperature and pressure.

In some embodiments of methods according to the present disclosure, combining the composition and the brine of the hydrocarbon-bearing formation at the temperature of the hydrocarbon-bearing formation does not result in the precipitation of the fluoropolyether compound. Phase behavior can be evaluated prior to treating the hydrocarbon-bearing formation with the composition by obtaining a sample of the brine from the hydrocarbon-bearing formation and/or analyzing the composition of the brine from the hydrocarbon-bearing formation and preparing an equivalent brine having the same or similar composition to the composition of the brine in the formation. The brine saturation level in a hydrocarbon-bearing formation can be determined using methods known in the art and can be used to determined the amount of brine that can be mixed with the composition. The brine and the composition are combined (e.g., in a container) at the temperature and then mixed together (e.g., by shaking or stirring). The mixture is then maintained at the temperature for 15 minutes, removed from the heat, and immediately visually evaluated to see if cloudiness or precipitation occurs. In some embodiments, the amount of brine that is added before cloudiness or precipitation occurs is at least 5, 10, 15, 20, 25, 30, 35, 40, 45, or at least 50% by weight, based on the total weight of brine and composition combined in the phase behavior evaluation.

The phase behavior of the composition and the brine can be evaluated over an extended period of time (e.g., 1 hour, 12 hours, 24 hours, or longer) to determine if any precipitation or cloudiness is observed. By adjusting the relative amounts of brine (e.g., equivalent brine) and the composition, it is possible to determine the maximum brine uptake capacity (above which precipitation or cloudiness occurs) of the composition at a given temperature. Varying the temperature at which the above procedure is carried out typically results in a more complete understanding of the suitability of compositions for a given well.

In some embodiments of the methods disclosed herein, the hydrocarbon-bearing formation has both liquid hydrocarbons and gas, and the hydrocarbon-bearing formation has at least a gas permeability that is increased after the hydrocarbon-bearing formation is treated with the composition. In some embodiments, the gas permeability after treating the hydrocarbon-bearing formation with the composition is increased by at least 5 percent (in some embodiments, by at least 10, 15, 20, 30, 40, 50, 60, 70, 80, 90, or 100 percent or more) relative to the gas permeability of the formation before treating the formation. In some embodiments, the gas permeability is a gas relative permeability. In some embodiments, the liquid (e.g., oil or condensate) permeability in the hydrocarbon-bearing formation is also increased (in some embodiments, by at least 5, 10, 15, 20, 30, 40, 50, 60, 70, 80, 90, or 100 percent or more) after treating the formation.

In some embodiments, the increase in gas permeability of the treated hydrocarbon-bearing formation is higher than an increase in gas permeability obtained when an equivalent hydrocarbon-bearing formation is treated with the solvent. The term "equivalent hydrocarbon-bearing formation" refers to a hydrocarbon-bearing formation that is similar to or the same (e.g., in chemical make-up, surface chemistry, brine composition, and hydrocarbon composition) as a hydrocarbon-bearing formation disclosed herein before it is treated with a method according to the present disclosure. In some embodiments, both the hydrocarbon-bearing formation and the equivalent hydrocarbon-bearing formation are siliciclastic formations, in some embodiments, greater than 50 percent sandstone. In some embodiments, the hydrocarbon-bearing formation and the equivalent hydrocarbon-bearing formation may have the same or similar pore volume and porosity (e.g., within 15 percent, 10 percent, 8 percent, 6 percent, or even within 5 percent).

The hydrocarbon-bearing formation having both gas and liquid hydrocarbons may have gas condensate, black oil, or volatile oil and may comprise, for example, at least one of methane, ethane, propane, butane, pentane, hexane, heptane, octane, nonane, decane, or higher hydrocarbons. The term "black oil" refers to the class of crude oil typically having gas-oil ratios (GOR) less than about 2000 scf/stb (356 $m^3/m^3$). For example, a black oil may have a GOR in a range from about 100 (18), 200 (36), 300 (53), 400 (71), or even 500 scf/stb (89 $m^3/m^3$) up to about 1800 (320), 1900 (338), or 2000 scf/stb (356 $m^3/m^3$). The term "volatile oil" refers to the class of crude oil typically having a GOR in a range between about 2000 and 3300 scf/stb (356 and 588 $m^3/m^3$). For example, a volatile oil may have a GOR in a range from about 2000 (356), 2100 (374), or 2200 scf/stb (392 $m^3/m^3$) up to about 3100 (552), 3200 (570), or 3300 scf/stb (588 $m^3/m^3$). In some embodiments, the composition at least partially solubilizes or at least partially displaces the liquid hydrocarbons in the hydrocarbon-bearing formation.

Generally, for the treatment methods disclosed herein, the amounts of the fluoropolyether compound and solvent (and type of solvent) is dependent on the particular application since conditions typically vary between wells, at different depths of individual wells, and even over time at a given location in an individual well. Advantageously, treatment methods according to the present disclosure can be customized for individual wells and conditions. For example, a method of making a composition useful for practicing the methods disclosed herein may include receiving (e.g., obtaining or measuring) data comprising the temperature and at least one of the hydrocarbon composition or the brine composition (including the brine saturation level and components of the brine) of a selected geological zone of a hydrocarbon-bearing formation. These data can be obtained or measured using techniques well known to one of skill in the art. A formulation may then be generated based at least in part on compatibility information concerning the fluoropolyether compound, the solvent, the temperature, and at least one of the hydrocarbon composition or brine composition of the selected geological zone of the formation. In some embodiments, the compatibility information comprises information concerning phase stability of a mixture of the fluoropolyether compound, the solvent, and a model brine composition, wherein the model brine composition is based at least partially on the brine composition of the geological zone of the formation. The phase stability of a solution or dispersion can be evaluated using the phase behavior evaluation described above. The phase behavior can be evaluated over an extended period of time (e.g., 1 hour, 12 hours, 24 hours, or longer) to determine if any precipitation or cloudiness is observed. In some embodiments, the compatibility information comprises information concerning solid (e.g., salts or asphaltenes) precipitation from a mixture of the fluoropolyether compound, the solvent, a model brine composition, and a model hydrocarbon composition, wherein the model brine composition is based at least partially on the brine composition of the geological zone of the formation, and wherein the model hydrocarbon composition is based at least partially on the hydrocarbon composition of the geological zone of the formation. In addition to using a phase behavior evaluation, it is also contemplated that one may be able obtain the compatibility information, in whole or in part, by computer simulation or by referring to previously determined, collected, and/or tabulated information (e.g., in a handbook or a computer database).

The hydrocarbon-bearing formations that may be treated according to the present disclosure may be siliciclastic (e.g., shale, conglomerate, diatomite, sand, and sandstone) or carbonate (e.g., limestone or dolomite) formations. Typically, and surprising, methods according to the present disclosure can be used to alter the wettability of siliciclastic formations. In some embodiments, the hydrocarbon-bearing formation is predominantly sandstone (i.e., at least 50 percent by weight sandstone). In some embodiments, the hydrocarbon-bearing formation is predominantly limestone (i.e., at least 50 percent by weight limestone).

Methods according to the present disclosure may be practiced, for example, in a laboratory environment (e.g., on a core sample (i.e., a portion) of a hydrocarbon-bearing formation or in the field (e.g., on a subterranean hydrocarbon-bearing formation situated downhole). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to hydrocarbon-bearing formations having these conditions. Those skilled in the art, after reviewing the instant disclosure, will recognize that various factors may be taken into account in practice of the any of the disclosed methods including the ionic strength of the brine, pH (e.g., a range from a pH of about 4 to about 10), and the radial stress at the wellbore (e.g., about 1 bar (100 kPa) to about 1000 bars (100 MPa)).

In the field, treating a hydrocarbon-bearing formation with a composition described herein can be carried out using methods (e.g., by pumping under pressure) well known to those skilled in the oil and gas art. Coil tubing, for example, may be used to deliver the composition to a particular geological zone of a hydrocarbon-bearing formation. In some embodiments of practicing the methods described herein it may be desirable to isolate a geological zone (e.g., with conventional packers) to be treated with the composition.

Methods according to the present disclosure are useful, for example on both existing and new wells. Typically, it is believed to be desirable to allow for a shut-in time after compositions described herein are treated with the hydrocarbon-bearing formations. Exemplary shut-in times include a few hours (e.g., 1 to 12 hours), about 24 hours, or even a few (e.g., 2 to 10) days. After the composition has been allowed to remain in place for the desired time, the solvent present in the composition may be recovered from the formation by simply pumping fluids up tubing in a well as is commonly done to produce fluids from a formation.

In some embodiments of methods according to the present disclosure, the method comprises treating the hydrocarbon-bearing formation with a fluid prior to treating the hydrocarbon-bearing formation with the composition. In some embodiments, the fluid at least one of at least partially solubilizes or at least partially displaces the brine in the hydrocarbon-bearing formation. In some embodiments, the fluid at least partially solubilizes the brine. In some embodiments, the fluid at least partially displaces the brine. In some embodiments, the fluid at least one of at least partially solubilizes or displaces liquid hydrocarbons in the hydrocarbon-bearing formation. In some embodiments, the fluid is substantially free of fluorinated surfactants. The term "substantially free of fluorinated surfactants" refers to fluid that may have a fluorinated surfactant in an amount insufficient for the fluid to have a cloud point (e.g., when it is below its critical micelle concentration). A fluid that is substantially free of fluorinated surfactant may be a fluid that has a fluorinated surfactant but in an amount insufficient to alter the wettability of, for example, a hydrocarbon-bearing formation under downhole conditions. A fluid that is substantially free of fluorinated surfactant includes those that have a weight percent of such polymers as low as 0 weight percent. The fluid may be useful for decreasing the concentration of at least one of the salts present in the brine prior to introducing the composition to the hydrocarbon-bearing formation. The change in brine composition may change the results of a phase behavior evaluation (e.g., the combination of a composition with a first brine prior to the fluid preflush may result in precipitation of salt or the fluoropolyether compound while the combination of the composition with the brine after the fluid preflush may result in no precipitation.)

In some embodiments of treatment methods disclosed herein, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether independently having from 2 to 25 carbon atoms. In some embodiments, useful polyols have 2 to 20, 2 to 15, 2 to 10, 2 to 8, or 2 to 6 carbon atoms. In some embodiments, useful polyol ethers may have from 3 to 25 carbon atoms, 3 to 20, 3 to 15, 3 to 10, 3 to 8, or from 5 to 8 carbon atoms. Exemplary useful polyols and polyol ethers include any of those described above for solvents. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments of the methods and treated hydrocarbon-bearing formations disclosed herein, the hydrocarbon-bearing formation has at least one fracture. In some embodiments, fractured formations have at least 2, 3, 4, 5, 6, 7, 8, 9, or 10 or more fractures. As used herein, the term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

In some embodiments of the methods disclosed herein, wherein treating the formation with the composition provides an increase in at least one of the gas permeability or the liquid permeability of the formation, the formation is a non-fractured formation (i.e., free of man-made fractures made, for example, by hydraulic fracturing). Advantageously, treatment methods disclosed herein typically provide an increase in at least one of the gas permeability or the hydrocarbon liquid permeability of the formation without fracturing the formation.

In some embodiments of the methods and treated hydrocarbon-bearing formations disclosed herein, wherein the hydrocarbon-bearing formation has at least one fracture, the fracture has a plurality of proppants therein. Prior to delivering the proppants into a fracture, the proppants may be treated with a fluoropolyether compound or may be untreated (e.g., may comprise less than 0.1% by weight fluoropolyether compound, based on the total weight of the plurality of proppants). In some embodiments, the fluoropolyether compound useful in practicing the present disclosure is adsorbed on at least a portion of the plurality of proppants.

Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

Proppants useful in practicing the present disclosure may have a particle size in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), or 300 micrometers to 600 micrometers (i.e., about 50 mesh to about 30 mesh).

In some embodiments of methods of treating fractured formations, the proppants form packs within a formation and/or wellbore. Proppants may be selected to be chemically compatible with the solvents and compositions described herein. The term "proppant" as used herein includes fracture proppant materials introducible into the formation as part of a hydraulic fracture treatment and sand control particulate introducible into the wellbore or formation as part of a sand control treatment such as a gravel pack or frac pack.

In some embodiments, methods according to the present disclosure include treating the hydrocarbon-bearing formation with the composition at least one of during fracturing or after fracturing the hydrocarbon-bearing formation. In some of these embodiments, the fracturing fluid, which may contain proppants, may be aqueous (e.g., a brine) or may contain predominantly organic solvent (e.g., an alcohol or a hydrocarbon). In some embodiments, it may be desirable for the fracturing fluid to include contain viscosity enhancing agents (e.g., polymeric viscosifiers), electrolytes, corrosion inhibitors, scale inhibitors, and other such additives that are common to a fracturing fluid.

In some embodiments of methods of treating fractured formations, the amount of the composition introduced into the fractured formation is based at least partially on the volume of the fracture(s). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Coil tubing, for example, may be used to deliver the composition to a particular fracture. In some embodiments, in practicing the methods disclosed herein it may be desirable to isolate the fracture (e.g., with conventional packers) to be treated with the composition.

In some embodiments, wherein the formation treated according to the methods described herein has at least one fracture, the fracture has a conductivity, and after the composition treats at least one of the fracture or at least a portion of the plurality of proppants, the conductivity of the fracture is increased (e.g., by 25, 50, 75, 100, 125, 150, 175, 200, 225, 250, 275, or by 300 percent).

Fluoropolyether compounds may also be useful, for example, for treating proppants before using the proppants in a fracturing and propping operation. Treated proppants may be prepared, for example, by dissolving or dispersing the fluoropolyether compound in a dispersing medium (e.g., water and/or organic solvent (e.g., alcohols, ketones, esters, alkanes and/or fluorinated solvents (e.g., hydrofluoroethers and/or perfluorinated carbons)) that is then applied to the particles. Optionally, a catalyst can be added (e.g., a Lewis acid or Lewis base). The amount of liquid medium used should be sufficient to allow the solution or dispersion to generally evenly wet the proppants being treated. Typically, the concentration of the fluoropolyether compound in the solution or dispersion is the range from about 5% to about 20% by weight, although amounts outside of this range may also be useful. The proppants are typically treated with the fluoropolyether compound solution or dispersion at temperatures in the range from about 25° C. to about 50° C., although temperatures outside of this range may also be useful. The treatment solution or dispersion can be applied to the proppants using techniques known in the art for applying solutions or dispersions to proppants (e.g., mixing the solution or dispersion and proppants in a vessel (in some embodiments under reduced pressure) or spraying the solutions or dispersions onto the particles). After application of the treatment solution or dispersion to the particles, the liquid medium can be removed using techniques known in the art (e.g., drying the particles in an oven). Typically, about 0.1 to about 5 (in some embodiments, for example, about 0.5 to about 2) percent by weight fluorinated polymer is added to the particles, although amounts outside of this range may also be useful.

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

While the drawing depicts an offshore operation, the skilled artisan will recognize that the methods for treating a production zone of a wellbore are equally well-suited for use in onshore operations. Also, while the drawing depicts a vertical well, the skilled artisan will also recognize that methods according to the present disclosure are equally well-suited for use in deviated wells, inclined wells or horizontal wells.

Selected Embodiments Of The Disclosure

In a first embodiment, the present disclosure provides a method comprising contacting a hydrocarbon-bearing formation with a composition comprising solvent and a fluoropolyether compound, wherein the fluoropolyether compound:

is represented by formula Rf'—[C(O)—NR$^1$—X'—(Z)$_m$]$_n$; or comprises at least one first divalent unit represented by

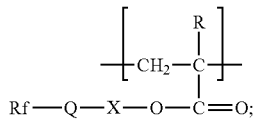

and at least one of
  a second divalent unit comprising a pendant Z group;
  or a monovalent unit comprising a thioether linkage and at least one terminal Z group,
wherein
  each Rf is independently a fluoropolyether group;
  Rf' is a monovalent or divalent fluoropolyether group;
  each Z group is independently —P(O)(OY)$_2$ or —O—P(O)(OY)$_2$;
  each Q is independently a bond, —C(O)—N(R$^1$)—, or —C(O)—O—;
  R and R$^1$ are each independently hydrogen or alkyl having up to 4 carbon atoms;
  each X is independently alkylene, arylalkylene, or alkylarylene, wherein alkylene, arylalkylene, and alkylarylene are each optionally interrupted by at least one ether linkage;
  each X' is independently divalent or trivalent alkylene, arylalkylene, or alkylarylene, wherein alkylene, arylalkylene, and alkylarylene are each optionally interrupted by at least one ester, amide, ether, or amine linkage;
  each Y is independently selected from the group consisting of hydrogen, alkyl, trialkylsilyl, a counter cation, or a bond to the formation; and
  m and n are each independently 1 or 2.

In a second embodiment, the present disclosure provides the method according to the first embodiment, wherein the fluoropolyether compound comprises at least one first divalent unit represented by

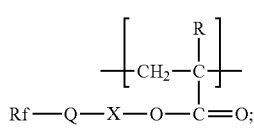

and at least one of
  a second divalent unit comprising a pendant Z group;
  or a monovalent unit comprising a thioether linkage and at least one terminal Z group.

In a third embodiment, the present disclosure provides the method according to the first or second embodiment, wherein each second divalent unit is represented by formula:

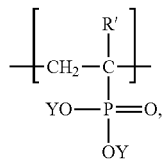

wherein R' is selected from the group consisting of hydrogen and alkyl having from 1 to 4 carbon atoms.

In a fourth embodiment, the present disclosure provides the method according to any one of the first to third embodiments, wherein the monovalent unit comprising a thioether linkage and at least one terminal Z group is represented by a formula selected from the group consisting of:

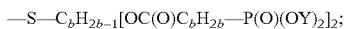

wherein each b is independently an integer from 1 to 5.

In a fifth embodiment, the present disclosure provides the method according to the first or second embodiment, wherein each second divalent unit is represented by formula:

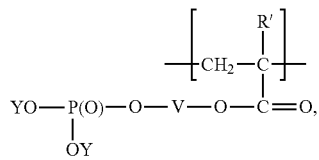

wherein
V is alkylene that is optionally interrupted by at least one ether linkage or amine linkage; and
R' is selected from the group consisting of hydrogen and alkyl having from 1 to 4 carbon atoms.

In a sixth embodiment, the present disclosure provides the method according to the first or second embodiment, wherein each first divalent unit is represented by formula:

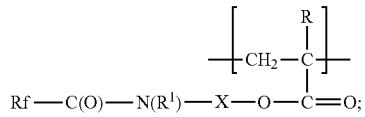

wherein each second divalent unit is represented by a formula selected from the group consisting of:

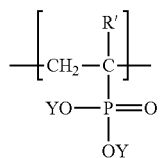

and
wherein the monovalent unit comprising a thioether linkage and at least one terminal Z group is represented by formula:

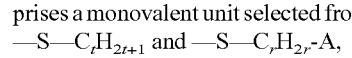

wherein
R' is independently selected from the group consisting of hydrogen and alkyl having from 1 to 4 carbon atoms;
V is alkylene that is optionally interrupted by at least one ether linkage or amine linkage;
W is a divalent or trivalent linking group selected from the group consisting of alkylene, arylalkylene, and arylene, wherein alkylene is optionally interrupted by at least one ether linkage, ester linkage, or amide linkage; and
m' is 1 or 2.

In a seventh embodiment, the present disclosure provides the method according to any one of the first to sixth embodiments, wherein the fluoropolyether compound further comprises a monovalent unit selected from the group consisting of —S—$C_tH_{2t+1}$ and —S—$C_rH_{2r}$-A,
wherein t is an integer having a value from 4 to 22;
r is an integer having a value from 2 to 10; and
A is selected from the group consisting of —OH, —COO$Y^2$, and —SO$_3Y^2$, wherein $Y^2$ is selected from the group consisting of hydrogen, alkyl, and a counter cation.

In an eighth embodiment, the present disclosure provides the method according to any one of the first to seventh embodiments, wherein the fluoropolyether compound further comprises at least one divalent unit represented by formula:

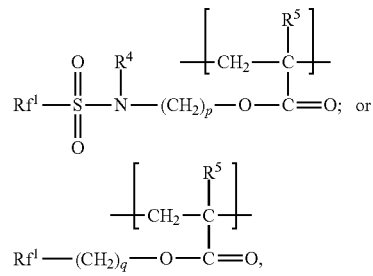

wherein
each $Rf^1$ is independently a fluoroalkyl group having from 3 to 12 carbon atoms;
$R^4$ and $R^5$ are each independently hydrogen or alkyl having from 1 to 4 carbon atoms;
each p is independently an integer having a value from 2 to 11;
each q is independently an integer having a value from 1 to 20.

In a ninth embodiment, the present disclosure provides the method according to any one of the first to eighth embodiments, wherein the fluoropolyether compound further comprises at least one divalent unit represented by formula:

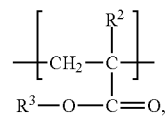

wherein
each $R^2$ is independently selected from the group consisting of hydrogen and alkyl having from 1 to 4 carbon atoms; and
each $R^3$ is independently alkyl having from 1 to 30 carbon atoms.

In a tenth embodiment, the present disclosure provides the method according to any one of the first to ninth embodiments, wherein the fluoropolyether compound is represented by formula:

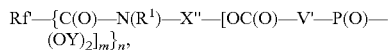

wherein
each X" is independently a divalent or trivalent group selected from the group consisting of alkylene, arylalkylene, and alkylarylene, wherein alkylene, arylalkylene, and alkylarylene are each optionally interrupted by at least one ether linkage; and
each V' is independently alkylene that is optionally interrupted by at least one ether linkage or amine linkage.

In an eleventh embodiment, the present disclosure provides the method according to the tenth embodiment, wherein X" is a divalent alkylene group, and wherein y is 1.

In a twelfth embodiment, the present disclosure provides the method according to the tenth embodiment, wherein X" is a trivalent alkylene group, and wherein y is 2.

In a thirteenth embodiment, the present disclosure provides the method according to the first embodiment, wherein the fluoropolyether compound is represented by formula

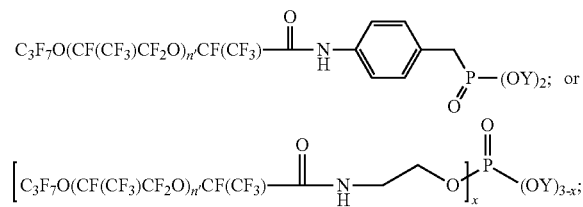

wherein n' is in a range from 4 to 50, and wherein x is 1 or 2.

In a fourteenth embodiment, the present disclosure provides the method according to any one of the first to twelfth embodiments, wherein Rf and Rf' are each independently $C_3F_7O(CF(CF_3)CF_2O)_{n'}CF(CF_3)$—, $C_3F_7O(CF_2CF_2CF_2O)_{n'}CF_2CF_2$—, or $CF_3O(C_2F_4O)_{n'}CF_2$—, and wherein n' has an average value in a range from 3 to 50.

In a fifteenth embodiment, the present disclosure provides the method according to the fourteenth embodiment, wherein Rf and Rf' are each independently $C_3F_7O(CF(CF_3)CF_2O)_{n'}CF(CF_3)$—, and wherein n' has an average value in a range from 4 to 7.

In a sixteenth embodiment, the present disclosure provides the method according to any one of the first to fifteenth embodiments, wherein the hydrocarbon-bearing formation comprises at least one of sandstone, shale, conglomerate, diatomite, or sand.

In a seventeenth embodiment, the present disclosure provides the method according to any one of the first to sixteenth embodiments, wherein the hydrocarbon-bearing formation comprises at least one of carbonates or limestone.

In an eighteenth embodiment, the present disclosure provides the method according to any one of the first to seventeenth embodiments, wherein the hydrocarbon-bearing formation has at least one fracture, and wherein the fracture has a plurality of proppants therein.

In a nineteenth embodiment, the present disclosure provides the method according to any one of the first to eighteenth embodiments, wherein the solvent comprises at least one of water, a monohydroxy alcohol, a glycol, an ether, a glycol ether, a ketone, or supercritical carbon dioxide, wherein the monohydroxy alcohol, glycol, ether, and ketone each independently have up to 4 carbon atoms, and wherein the glycol ether has up to 9 carbon atoms.

In a twentieth embodiment, the present disclosure provides the method according to any one of the first to nineteenth embodiments, wherein before contacting the hydrocarbon-bearing formation with the composition, the hydrocarbon-bearing formation has at least one of brine or liquid hydrocarbons, and wherein the hydrocarbon-bearing formation has at least a gas permeability that is increased after it is contacted with the composition.

In a twenty-first embodiment, the present disclosure provides the method according to the twentieth embodiment, further comprising contacting the hydrocarbon-bearing formation with a fluid before contacting the hydrocarbon-bearing formation with the composition, wherein the fluid at least one of at least partially solubilizes or partially displaces at least one of the brine or liquid hydrocarbons in the hydrocarbon-bearing formation.

In a twenty-second embodiment, the present disclosure provides the method according to any one of the first to twenty-first embodiments, wherein the hydrocarbon-bearing formation is penetrated by a wellbore, and wherein a region near the wellbore is contacted with the composition.

In a twenty-third embodiment, the present disclosure provides a hydrocarbon-bearing formation comprising a surface, wherein at least a portion of the surface is contacted according to the method according to any one of the first to twenty-second embodiments.

Advantages and embodiments of the methods disclosed herein are further illustrated by the following examples, but the particular materials and amounts thereof recited in these examples, as well as other conditions and details, should not be construed to unduly limit this disclosure. Unless otherwise noted, all parts, percentages, ratios, etc. in the examples and the rest of the specification are by weight. In the Tables, "nd" means not determined.

EXAMPLES

Preparation of $C_3F_7O(C_3F_6O)_kCFCF_2C(O)NHCH_2CH_2OC(O)CH=CH_2$ (HFPOA)

$C_3F_7O(C_3F_6O)_kCFCF_2COOCH_3$ was prepared as described in U.S. Pat. No. 6,995,222 (Buckanin et al.), Preparative Example 1, the disclosure of which example is incorporated herein by reference, as a mixture containing 0.002% k=2, 5.9% k=3, 25.2% k=4, 27% k=5, 20.7% k=6, 12.4% k=7, 5.4% k=8, 1.8% k=9, and 0.5% k=10 as determined by gas/liquid chromatography and gas/liquid chromatography/mass spectrometry, and having a number average molecular weight of 1232 grams per mole as calculated from the chromatography data.

$C_3F_7O(C_3F_6O)_kCFCF_2COOCH_3$ was treated with 2-aminoethanol as described on column 16, lines 37-62 of U.S. Pat. No. 7,094,829 (Audenaert et al.), the disclosure of which is incorporated herein by reference, to provide $C_3F_7O(C_3F_6O)_kCFCF_2C(O)NHCH_2CH_2OH$.

In a 500-mL 3-necked flask fitted with a mechanical stirrer, a thermometer, and a condenser, 121.6 grams (0.1 mol) $C_3F_7O(C_3F_6O)_kCFCF_2C(O)NHCH_2CH_2OH$, 60 grams of methyl ethyl ketone, 60 grams of a hydrofluoroether obtained from 3M Company, St. Paul, Minn. under the trade designation "HFE-7200", 10.1 grams of triethylamine (0.1 mol) 0.01 grams of hydroquinone monomethyl ether (MEHQ), and 0.01 grams of phenothazine were combined. The mixture was cooled to about 5° C. using an ice bath, and 10.1 grams (0.11 mol) of acrylochloride were added over about 1 hour under nitrogen. An exothermic reaction was observed, and a precipitate formed. The temperature was allowed to rise to 25° C. and stirred for about 1 hour. The reaction was warmed to 50° C. and stirred under nitrogen for another hour. The resulting mixture was washed 3 times with water (200 mL). The resulting organic solution was distilled at 50° C. under vacuum to remove the solvents and to provide 123.2 grams of HFPOA as a clear, brownish-yellow liquid, identified by $^{1}$H and $^{19}$F nuclear magnetic resonance spectroscopy.

Fluorinated Ether Phosphonate 1

In a 3-necked, 250-mL flask equipped with a mechanical stirrer, a condenser, and a thermometer, HFPOA (35 grams), 10 grams of octadecylmethacrylate (ODMA), 2.5 grams of vinylphosphonic acid, 2.5 grams of octylmercaptan, 20 grams of "HFE-7200" hydrofluoroether, and 30 grams of isopropanol (IPA) were combined. The reaction mixture was degassed under vacuum and purged with nitrogen, and 0.1 gram of "VAZO-67" 2,2'-azobis(2-methylbutyronitrile) was added. The reaction was heated to 65° C. under nitrogen for 6 hours. Additional "VAZO-67" 2,2'-azobis(2-methylbutyronitrile) (0.05 gram) was added, and the reaction was continued for 16 hours at 65° C. A clear solution was obtained. About 0.1% by weight of the starting monomers remained as evidenced by gas/liquid chromatography analysis.

Fluorinated Ether Phosphonate 2

Fluorinated Ether Phosphonate 2 was prepared according to the method of Fluorinated Ether Phosphonate 1 except using N-methylperfluorobutanesulfonamidoethyl acrylate (MeFBSEA) instead of ODMA. The weight ratio of HFPOA, MeFBSEA, and vinylphosphonic acid was 2:7:1. Also, 3% by weight of mercaptopropanediol was used instead of octylmercaptan, and the ratio of IPA to "HFE-7200" hydrofluoroether was 8:2.

MeFBSEA was made according to the method of U.S. Pat. No. 6,664,354 (Savu), Example 2, Parts A and B, incorporated herein by reference, except using 4270 kg of N-methylperfluorobutanesulfonamidoethanol, 1.6 kg of phenothiazine, 2.7 kg of methoxyhydroquinone, 1590 kg of heptane, 1030 kg of acrylic acid, 89 kg of methanesulfonic acid (instead of triflic acid), and 7590 kg of water in Part B.

Fluorinated Ether Phosphonate 3

In a 500-mL 3-necked flask equipped with a mechanical stirrer, a Dean-Stark trap condenser, and a thermometer, 126.1 grams (0.1 mole) of $C_3F_7O(CF(CF_3)CF_2O)_kCF(CF_3)C(O)NHCH_2CH_2OH$, 15 grams (0.1 mole) 2-phosphonopropionic acid, 40 grams of methyl isobutyl ketone (MIBK), and 0.5 grams of methanesulfonic acid were combined. The reaction was heated at reflux for 6 hours. During this time about 1.8 grams of water were collected in the Dean-Stark trap. The MIBK was removed under vacuum. The product was analyzed by $^{1}$H, $^{19}$F, and $^{31}$P nuclear magnetic resonance spectroscopy, and the data were consistent with a product having the structure $C_3F_7O(CF(CF_3)CF_2O)_kCF(CF_3)C(O)NHCH_2CH_2OC(O)CH_2CH_2P(O)(OH)_2$.

Fluorinated Ether Phosphate 1:

$(C_3F_7O(CF(CF_3)CF_2O)_kCF(CF_3)C(O)$
$NHCH_2CH_2O)_x P(O)(O-NH_4+)_{3-x}$

Fluorinated Ether Phosphate 1 was prepared according to the method of Example 1 of U.S. Pat. App. Pub. No. 2005/0048288 (Flynn et al.), incorporated herein by reference. The product was neutralized with an aqueous solution of ammonium hydroxide.

Fluorinated Ether Phosphonate 4:

Fluorinated Ether Phosphonate 4 was prepared according to the method of Example 2 of U.S. Pat. App. Pub. No. 2005/0048288 (Flynn et al.), incorporated herein by reference.

Examples 1 to 5

Treatment Composition Preparation

Treatment Compositions 1 to 5 were prepared by combining the Fluorinated Ether Phosphonates or Phosphates shown in Table 1, below, with 2 or more solvents, shown in Table 1, below. The components were mixed together using a magnetic stirrer and a magnetic stir bar. The weight percentages of each of the components after mixing are shown in Table 1, below.

TABLE 1

| Treatment Composition | Fluorinated Ether (FE) (wt. %) | Solvent 1 (wt. %) | Solvent 2 | Solvent 3 |
|---|---|---|---|---|
| 1 | FE Phosphonate 1 (1) | Isopropanol (74) | Hydrofluoroether "HFE-7200" (25) | Not used |
| 2 | FE Phosphonate 2 (1) | Isopropanol (94) | Hydrofluoroether "HFE-7200" (5) | Not used |
| 3 | FE Phosphonate 3 (1) | 2-butoxy ethanol (30) | Ethanol (54) | Hydrofluoroether "HFE-7200" (15) |
| 4 | FE Phosphate 1 (1) | Isopropanol (84) | Hydrofluoroether "HFE-7200" (15) | Not used |
| 5 | FE Phosphonate 4 (1) | 2-butoxy ethanol (35) | Ethanol (49.5) | Hydrofluoroether "HFE-7200" (15) |

Figure 2:
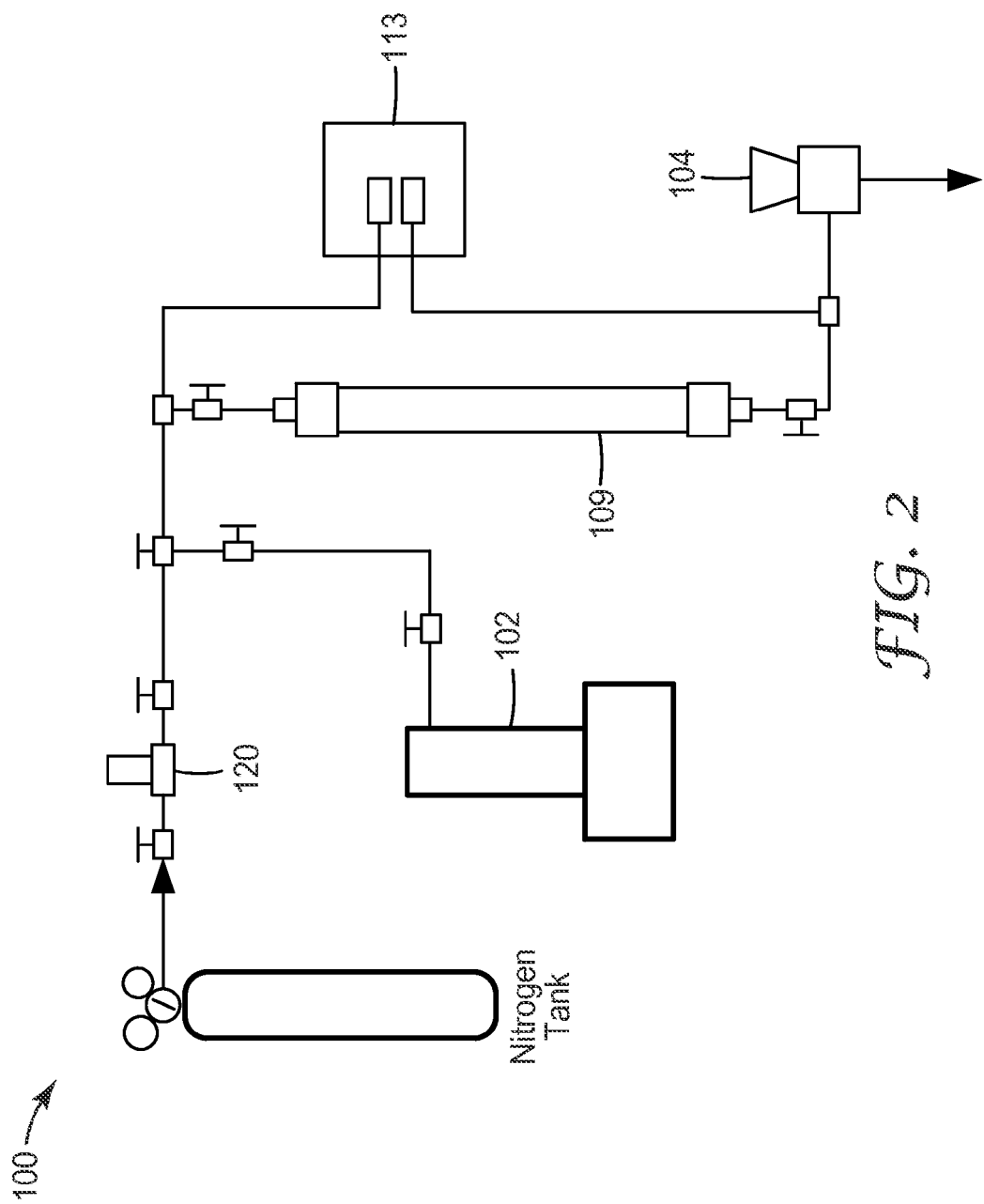
FIG. 2 is a schematic illustration of the flow apparatus used for Examples 1 to 10 and Control Examples A and B.

Flow Setup and Procedure:

A schematic diagram of a flow apparatus 100 used to determine relative permeability of sea sand or calcium carbonate is shown in FIG. 2. Flow apparatus 100 included positive displacement pump 102 (Model Gamma/4-W 2001 PP, obtained from Prolingent AG, Regensdorf, Germany) to inject n-heptane at constant rate. Nitrogen gas was injected at constant rate through a gas flow controller 120 (Model DK37/MSE, Krohne, Duisburg, Germany). Pressure indicators 113, obtained from Siemens under the trade designation "SITRANS P" 0-16 bar, were used to measure the pressure drop across a sea sand pack in vertical stainless steel core holder 109 (20 cm by 12.5 cm$^2$) (obtained from 3M Company, Antwerp, Belgium). A back-pressure regulator (Model No. BS(H)2; obtained from RHPS, The Netherlands) 104 was used to control the flowing pressure upstream and downstream of core holder 109. Core holder 109 was heated by circulating silicone oil, heated by a heating bath obtained from Lauda, Switzerland, Model R22.

The core holder was filled with sea sand (obtained from Aldrich, Bornem, Belgium, grade 60-70 mesh) and then heated to 75° C. The temperature of 75° C. was maintained for each of the flows described below. A pressure of about 5 bar (5×10$^5$ Pa) was applied, and the back pressure was regulated in such a way that the flow of nitrogen gas through the sea sand was about 500 to 1000 mL/minute. The initial gas permeability was calculated using Darcy's law.

Synthetic brine according to the natural composition of North Sea brine was prepared by mixing 5.9% sodium chloride, 1.6% calcium chloride, 0.23% magnesium chloride, and 0.05% potassium chloride and distilled water up to 100% by weight. The brine was introduced into the core holder at about 1 mL/minute using displacement pump 102.

Heptane was then introduced into the core holder at about 0.5 mL/minute using displacement pump 102. Nitrogen and n-heptane were co-injected into the core holder until steady state was reached.

The treatment composition was then injected into the core at a flow rate of 1 mL/minute for about one pore volume. The gas permeability after treatment was calculated from the steady state pressure drop, and improvement factor was calculated as the permeability after treatment/permeability before treatment.

Heptane was then injected for about four to six pore volumes. The gas permeability and improvement factor were again calculated.

For Examples 1 to 5, the liquid used for each injection, the initial pressure, the pressure change (ΔP), the flow rate for each injection, the amount of liquid used for each injection, the flow rate of gas through the core (Q), the gas permeability (K), and the improvement factor (PI) are shown in Table 2, below.

TABLE 2

| Example | Liquid | Pressure (initial) | ΔP | Flow (mL/min) | Amount Liquid (g) | Q (mL/sec) | K (Darcy) | PI |
|---|---|---|---|---|---|---|---|---|
| 1 | none | 5.1 | 0.01 | 820 | none | 13.7 | 37.1 | |
|   | brine | 5.5 | 0.09 | 850 | 55 | 14.7 | 4.7 | |
|   | heptane | 6.0 | 0.09 | 820 | 50 | 14.1 | 4.2 | |
|   | Treatment Comp. 1 | 6.1 | 0.04 | 880 | 108 | 15.0 | 10.2 | 2.4 |
|   | heptane | 5.9 | 0.04 | 850 | 147 | 14.5 | 10.4 | 2.5 |
| 2 | none | 5.2 | 0.01 | 620 | none | 10.3 | 28.1 | |
|   | brine | 5.5 | 0.13 | 580 | 50 | 10.2 | 2.2 | |
|   | heptane | 5.7 | 0.12 | 570 | 75 | 10.1 | 2.3 | |
|   | Treatment Comp. 2 | 5.4 | 0.06 | 590 | 100 | 10.1 | 4.4 | 1.9 |
|   | heptane | 5.5 | 0.07 | 610 | 230 | 10.5 | 4.4 | 1.9 |
| 3 | none | 5.3 | 0.01 | 900 | none | 15 | 40.8 | |
|   | brine | 5.4 | 0.07 | 840 | 60 | 14.4 | 6.0 | |
|   | heptane | 6.2 | 0.07 | 820 | 60 | 14.1 | 5.1 | |
|   | Treatment Comp. 3 | 5.9 | 0.03 | 920 | 120 | 15.6 | 15.2 | 3.0 |
|   | heptane | 5.8 | 0.04 | 900 | 150 | 15.3 | 12.0 | 2.3 |
| 4 | none | 5.1 | 0.01 | 680 | none | 11.3 | 30.8 | |
|   | brine | 5.3 | 0.15 | 670 | 55 | 11.9 | 2.2 | |
|   | heptane | 5.5 | 0.14 | 650 | 65 | 11.6 | 2.3 | |
|   | Treatment Comp. 4 | 5.5 | 0.06 | 670 | 100 | 11.5 | 4.9 | 2.1 |
|   | heptane | 5.4 | 0.07 | 680 | 165 | 11.7 | 4.4 | 1.9 |
| 5 | none | 5.1 | 0.01 | 680 | none | 11.3 | 30.8 | |
|   | brine | 5.7 | 0.13 | 700 | 65 | 12.4 | 2.5 | |
|   | heptane | 6.2 | 0.13 | 650 | 50 | 11.4 | 2.4 | |
|   | Treatment Comp. 5 | 5.9 | 0.07 | 700 | 95 | 12 | 4.9 | 2.0 |
|   | heptane | 6.1 | 0.06 | 700 | 140 | 12 | 5.35 | 2.26 |
| Control A | none | 5.2 | 0.01 | 860 | none | 14.3 | 38.9 | |
|   | brine | 5.5 | 0.15 | 650 | 55 | 11.6 | 2.2 | |
|   | heptane | 5.4 | 0.13 | 400 | 65 | 7.1 | 1.4 | |
|   | 2-butoxyethanol/ethanol | 5.6 | 0.09 | 400 | 150 | 6.9 | 2.0 | 1.4 |
|   | heptane | 5.5 | 0.14 | 420 | 130 | 7.6 | 1.5 | 1.03 |

Control Example A

Control Example A was carried out according to the method of Examples 1 to 5 with the exception that the treatment composition contained only 2-butoxyethanol (70% by weight) and ethanol (30% by weight). The liquid used for each injection, the initial pressure, the pressure change (ΔP), the flow rate for each injection, the amount of liquid used for each injection, the flow rate of gas through the core (Q), the gas permeability (K), and the improvement factor (PI) are shown in Table 2, above.

Examples 6 to 8

Examples 6 to 8 were carried out according to the method of Examples 1 to 5, except that no heptane flows were carried out.

For Examples 6 to 8, the liquid used for each injection, the initial pressure, the pressure change (ΔP), the flow rate for each injection, the amount of liquid used for each injection, the flow rate of gas through the core (Q), the gas permeability (K), and the improvement factor (PI) are shown in Table 3, below.

TABLE 3

| Example | Liquid | Pressure (initial) | ΔP | Flow (mL/min) | Amount Liquid (g) | Q (mL/sec) | K (Darcy) | PI |
|---|---|---|---|---|---|---|---|---|
| 6 | none | 6.2 | 0.01 | 730 | none | 12.1 | 33.1 | |
|   | brine | 6.3 | 0.07 | 450 | 80 | 7.8 | 3.0 | |
|   | Treatment Comp. 1 | 6.3 | 0.03 | 540 | 120 | 9.2 | 9.6 | 3.2 |
|   | brine | 6.4 | 0.03 | 500 | 360 | 8.5 | 8.0 | 2.6 |
| 7 | none | 5.1 | 0.01 | 900 | none | 15.7 | 40.6 | |
|   | brine | 5.2 | 0.10 | 700 | 120 | 12.2 | 3.4 | |
|   | Treatment Comp. 3 | 5.3 | 0.04 | 920 | 110 | 20.8 | 8.4 | 2.5 |
|   | brine | 5.3 | 0.04 | 900 | 360 | 15.3 | 8.1 | 2.4 |
| 8 | none | 5.4 | 0.01 | 780 | none | 13 | 35.3 | |
|   | brine | 5.9 | 0.07 | 800 | 55 | 13.7 | 5.6 | |
|   | Treatment Comp. 5 | 6.1 | 0.03 | 800 | 150 | 13.5 | 14.6 | 2.6 |
|   | brine | 6.1 | 0.03 | 700 | 200 | 11.9 | 14 | 2.5 |
| Control B | None | 5.4 | 0.01 | 950 | none | 15.8 | 43 | |
|   | Brine | 5.9 | 0.1 | 1200 | 155 | 21 | 5.6 | |
|   | Treatment Comp. Control B | 6.3 | 0.05 | 1000 | 150 | 17.1 | 9.8 | 1.75 |
|   | brine | 6.4 | 0.05 | 950 | 80 | 16.1 | 8.8 | 1.6 |
|   | brine | 6.4 | 0.1 | 820 | 180 | 14.4 | 4.1 | 0.7 |

Control Example B

Control Example B was carried out according to the method of Examples 6 to 8 with the exception that the treatment composition contained 1% by weight cocoamidopropylsulfobetaine, obtained from SEPPIC, France, under the trade designation "AMONYL 675 SB", 2-butoxyethanol (69.5% by weight) and ethanol (29.5% by weight). The liquid used for each injection, the initial pressure, the pressure change (ΔP), the flow rate for each injection, the amount of liquid used for each injection, the flow rate of gas through the core (Q), the gas permeability (K), and the improvement factor (PI) are shown in Table 3, above.

Examples 9 and 10

Examples 9 and 10 were carried out according to the method of Examples 1 and 4, with Treatment Compositions 1 and 4, except that particulate calcium carbonate (obtained from Merck, Darmstadt, Germany, as granular marble, particle size in a range from 0.5 mm to 2 mm) was used instead of sea sand. The liquid for each injection, the initial pressure, the pressure change (ΔP), the flow rate for each injection, the amount of liquid used for each injection, the flow rate of gas through the core (Q), the gas permeability (K), and the improvement factor (PI) are shown in Table 4, below.

TABLE 4

| Example | Liquid | Pressure (initial) | ΔP | Flow (mL/min) | Amount Liquid (g) | Q (mL/sec) | K (Darcy) | PI |
|---|---|---|---|---|---|---|---|---|
| 9 | none | 5.0 | 0.01 | 420 | none | 7.0 | 19.0 | |
| | brine | 5.1 | 0.13 | 390 | 50 | 6.9 | 1.4 | |
| | heptane | 5.1 | 0.13 | 360 | 73 | 6.4 | 1.4 | |
| | Treatment Comp. 1 | 5.1 | 0.06 | 360 | 95 | 6.2 | 3.0 | 2.2 |
| | heptane | 5.2 | 0.06 | 350 | 208 | 6.0 | 2.7 | 2.0 |
| 10 | none | 5.1 | 0.01 | 550 | none | 9.2 | 24.9 | |
| | brine | 5.2 | 0.14 | 500 | 56 | 8.9 | 1.7 | |
| | heptane | 5.25 | 0.13 | 470 | 84 | 8.35 | 1.7 | |
| | Treatment Comp. 4 | 5.2 | 0.06 | 480 | 103 | 8.25 | 3.5 | 2.1 |
| | heptane | 5.2 | 0.07 | 470 | 219 | 8.1 | 3.3 | 1.9 |

Figure 3:
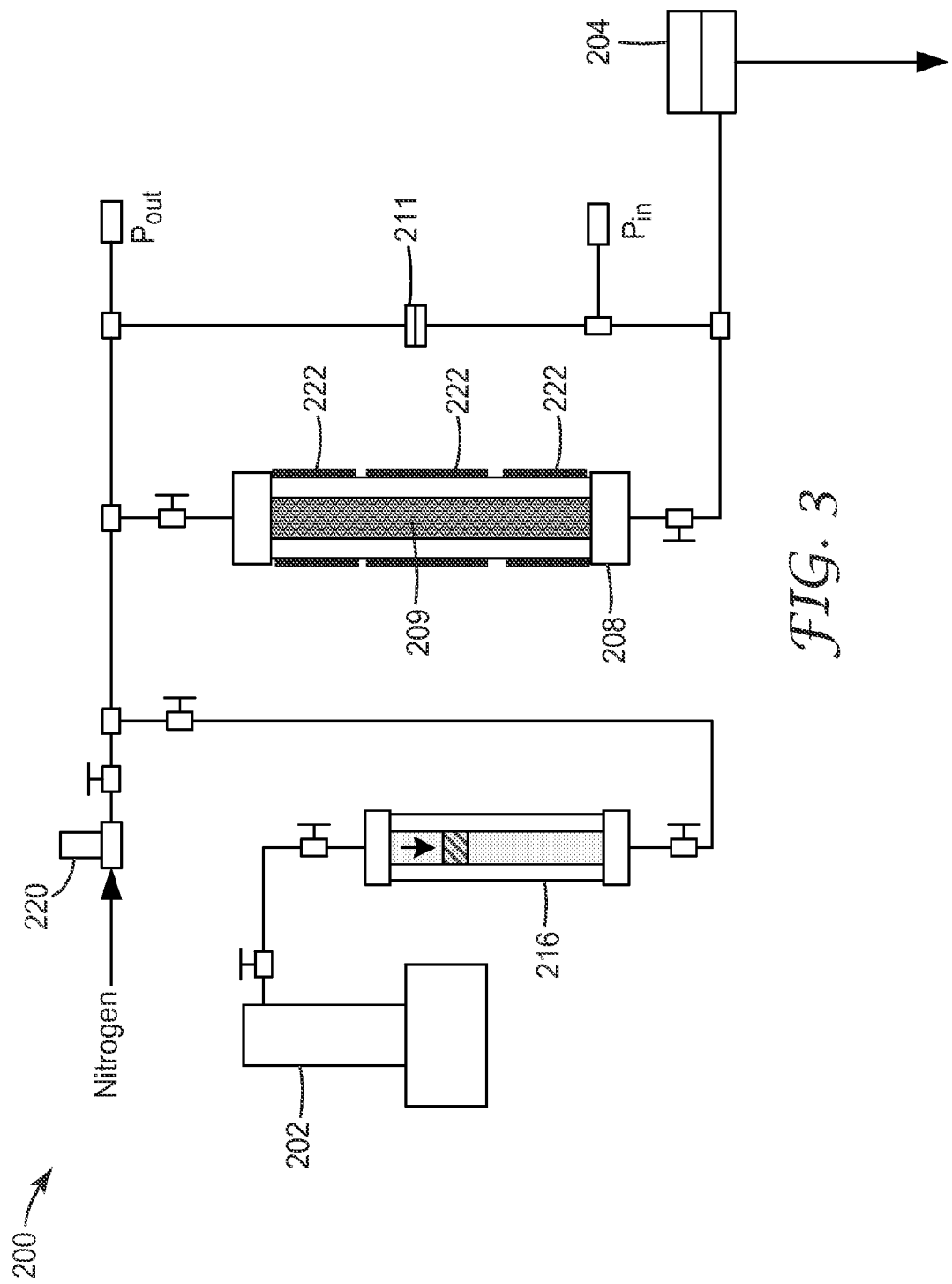
FIG. 3 is a schematic illustration of a core flood set-up that can be used to evaluate the method disclosed herein in a laboratory.

The results of the evaluations using sea sand or particulate calcium carbonate can be verified using core flood evaluations either on sandstone or limestone. A schematic diagram of a core flood apparatus 200 that can be used is shown in FIG. 3. Core flood apparatus 200 includes positive displacement pump 202 (Model QX6000SS, obtained from Chandler Engineering, Tulsa, Okla.) to inject n-heptane at constant rate into fluid accumulators 216. Nitrogen gas can be injected at constant rate through a gas flow controller 220 (Model 5850 Mass Flow Controller, Brokks Instrument, Hatfield, Pa.). A pressure port 211 on high-pressure core holder 208 (Hassler-type Model RCHR-1.0 obtained from Temco, Inc., Tulsa, Okla.) can be used to measure pressure drop across the vertical core 209. A back-pressure regulator (Model No. BP-50; obtained from Temco, Tulsa, Okla.) 204 can be used to control the flowing pressure downstream of core 209. High-pressure core holder 208 can be heated with 3 heating bands 222 (Watlow Thinband Model STB4A2AFR-2, St. Louis, Mo.).

In a typical procedure, a core can be dried for 72 hours in a standard laboratory oven at 95° C. and then wrapped in aluminum foil and heat shrink tubing. Referring again to FIG. 3, the wrapped core 209 can placed in core holder 208 at the desired temperature. An overburden pressure of, for example, 2300 psig ($1.6 \times 10^7$ Pa) can be applied. The initial single-phase gas permeability can be measured using nitrogen at low system pressures between 5 to 10 psig ($3.4 \times 10^4$ to $6.9 \times 10^4$ Pa).

Deionized water or brine can be introduced into the core 209 by the following procedure to establish the desired water saturation. The outlet end of the core holder is connected to a vacuum pump and a full vacuum can be applied for 30 minutes with the inlet closed. The inlet can be connected to a burette with the water in it. The outlet is closed and the inlet is opened to allow 2.1 mL of water to flow into the core. The inlet and the outlet valves can then be closed for the desired time. The gas permeability can be measured at the water saturation by flowing nitrogen at 500 psig ($3.4 \times 10^6$ Pa). The core holder 208 can then be heated to a higher temperature, if desired, for several hours. Nitrogen and n-heptane can be co-injected into the core at an average total flow rate in the core of, for example, 450 mL/hour at a system pressure of, for example, 900 psig ($6.2 \times 10^6$ Pa) until steady state is reached. The flow rate of nitrogen is controlled by gas flow controller 220, and the rate for n-heptane is controlled by positive displacement pump 202. The flow rates of nitrogen and n-heptane can be set such that the fractional flow of gas in the core was 0.66. The gas relative permeability before treatment can then be calculated from the steady state pressure drop. The treatment composition can then be injected into the core at a flow rate of, for example, 120 mL/hour for about 20 pore volumes. Nitrogen and n-heptane co-injection can be resumed at an average total flow rate in the core of, for example, 450 mL/hour at a system pressure of, for example, 900 psig ($6.2 \times 10^6$ Pa) until steady state is reached. The gas relative permeability after treatment can then be calculated from the steady state pressure drop.

Various modifications and alterations of this disclosure may be made by those skilled the art without departing from the scope and spirit of the disclosure, and it should be understood that this disclosure is not to be unduly limited to the illustrative embodiments set forth herein.

What is claimed is:

1. A method comprising contacting a hydrocarbon-bearing formation with a composition comprising solvent and a fluoropolyether compound, wherein the fluoropolyether compound:

is represented by formula Rf'—{C(O)—N(R¹)—X"—[OC(O)—V'—P(O)—(OY)₂]ᵧ}_z,

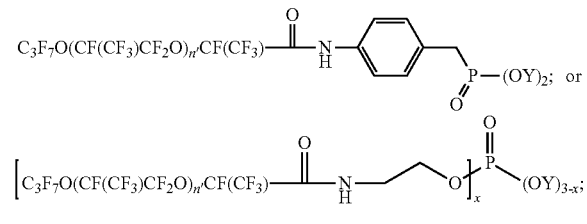

or comprises at least one first divalent unit represented by

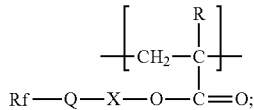

and at least one of
a second divalent unit comprising a pendant Z group;
or a monovalent unit comprising a thioether linkage and at least one terminal Z group,
wherein
each Rf is independently a fluoropolyether group;
Rf' is a monovalent or divalent fluoropolyether group;
each Z group is independently —P(O)(OY)₂ or —O—P(O)(OY)₂;
each Q is independently a bond, —C(O)—N(R¹)—, or —C(O)—O—;
R and R¹ are each independently hydrogen or alkyl having up to 4 carbon atoms;
each X is independently alkylene, arylalkylene, or alkylarylene, wherein alkylene, arylalkylene, and alkylarylene are each optionally interrupted by at least one ether linkage;
each X" is independently a divalent or trivalent group selected from the group consisting of alkylene, arylalkylene, and alkylarylene, wherein alkylene, arylalkylene, and alkylarylene are each optionally interrupted by at least one ether linkage;

each V' is independently alkylene that is optionally interrupted by at least one ether linkage or amine linkage;
each Y is independently selected from the group consisting of hydrogen, alkyl, trialkylsilyl, a counter cation, or a bond to the formation;
n' is in a range from 4 to 50;
x is 1 or 2; and
y and z are each independently 1 or 2.

2. The method according to claim 1, wherein the fluoropolyether compound comprises at least one first divalent unit represented by

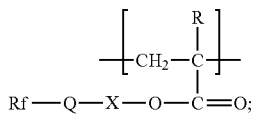

Rf—Q—X—O—C=O;

and at least one of
a second divalent unit comprising a pendant Z group;
or a monovalent unit comprising a thioether linkage and at least one terminal Z group.

3. The method according to claim 2, wherein the fluoropolyether compound further comprises a monovalent unit selected from the group consisting of —S—$C_tH_{2t+1}$ and —S—$C_rH_{2r}$-A,
wherein t is an integer having a value from 4 to 22;
r is an integer having a value from 2 to 10; and
A is selected from the group consisting of —OH, —$COOY^2$, and —$SO_3Y^2$, wherein $Y^2$ is selected from the group consisting of hydrogen, alkyl, and a counter cation.

4. The method according to claim 2, wherein the fluoropolyether compound further comprises at least one divalent unit represented by formula:

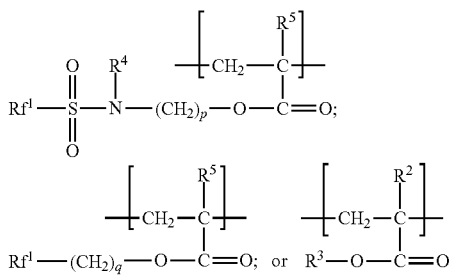

wherein
each $Rf^1$ is independently a fluoroalkyl group having from 3 to 12 carbon atoms;
$R^4$ and $R^5$ are each independently hydrogen or alkyl having from 1 to 4 carbon atoms;
each p is independently an integer having a value from 2 to 11;
each q is independently a value from 1 to 20;
each $R^2$ is independently selected from the group consisting of hydrogen and alkyl having from 1 to 4 carbon atoms; and
each $R^3$ is independently alkyl having from 1 to 30 carbon atoms.

5. The method according to claim 1, wherein the monovalent unit comprising a thioether linkage and at least one terminal Z group is represented by a formula selected from the group consisting of:

—S—$C_bH_{2b}$OC(O)$C_bH_{2b}$—P(O)(OY)$_2$; and

—S—$C_bH_{2b-1}$[OC(O)$C_bH_{2b}$—P(O)(OY)$_2$]$_2$, wherein each b is independently an integer from 1 to 5.

6. The method according to claim 1, wherein each first divalent unit is represented by formula:

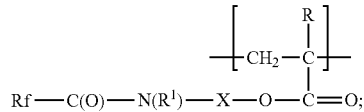

Rf—C(O)—N($R^1$)—X—O—C=O;

wherein each second divalent unit is represented by a formula selected from the group consisting of:

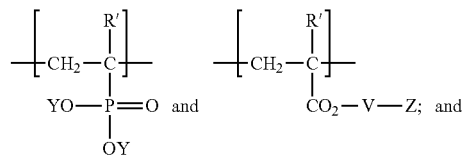

wherein the monovalent unit comprising a thioether linkage and at least one terminal Z group is represented by formula:

—S—W—[Z]$_{m'}$;

wherein
R' is independently selected from the group consisting of hydrogen and alkyl having from 1 to 4 carbon atoms;
V is alkylene that is optionally interrupted by at least one ether linkage or amine linkage;
W is a divalent or trivalent linking group selected from the group consisting of alkylene, arylalkylene, and arylene, wherein alkylene is optionally interrupted by at least one ether linkage, ester linkage, or amide linkage; and
m' is 1 or 2.

7. A method according to claim 1, wherein the fluoropolyether compound is represented by formula:

Rf—{C(O)—N($R^1$)—X"—[OC(O)—V'—P(O)—(OY)$_2$]$_y$}$_z$, wherein
each X" is independently a divalent or trivalent group selected from the group consisting of alkylene, arylalkylene, and alkylarylene, wherein alkylene, arylalkylene, and alkylarylene are each optionally interrupted by at least one ether linkage;
each V' is independently alkylene that is optionally interrupted by at least one ether linkage or amine linkage, and
y and z are each independently 1 or 2.

8. The method according to claim 7, wherein X" is a trivalent alkylene group, and wherein y is 2.

9. The method according to claim 1, wherein the fluoropolyether compound is represented by formula

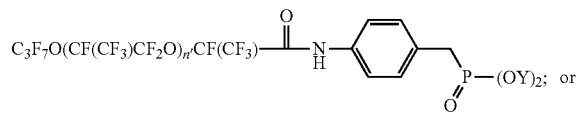

$C_3F_7O(CF(CF_3)CF_2O)_{n'}CF(CF_3)$— ... —P—(OY)$_2$; or

-continued

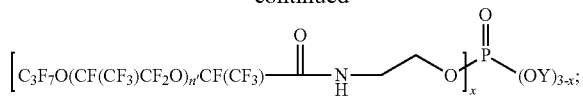

wherein n' is in a range from 4 to 50, and wherein x is 1.

10. The method according to claim 1, wherein Rf and Rf' are each independently $C_3F_7O(CF(CF_3)CF_2O)_{n'}CF(CF_3)-$, $C_3F_7O(CF_2CF_2CF_2O)_{n'}CF_2CF_2-$, or $CF_3O(C_2F_4O)_{n'}CF_2-$, and wherein n' has an average value in a range from 3 to 50.

11. The method according to claim 1, wherein the hydrocarbon-bearing formation comprises at least one of sandstone, shale, conglomerate, diatomite, sand, limestone, or dolomite.

12. The method according to claim 1, wherein the hydrocarbon-bearing formation has at least one fracture, and wherein the fracture has a plurality of proppants therein.

13. The method according to claim 1, wherein the solvent comprises at least one of water, a monohydroxy alcohol, a glycol, an ether, a glycol ether, a ketone, or supercritical carbon dioxide, wherein the monohydroxy alcohol, glycol, ether, and ketone each independently have up to 4 carbon atoms, and wherein the glycol ether has up to 9 carbon atoms.

14. The method according to claim 1, wherein before contacting the hydrocarbon-bearing formation with the composition, the hydrocarbon-bearing formation has at least one of brine or liquid hydrocarbons, and wherein the hydrocarbon-bearing formation has at least a gas permeability that is increased after it is contacted with the composition.

15. A hydrocarbon-bearing formation comprising a surface, wherein at least a portion of the surface is contacted according to the method of claim 1.

16. The method according to claim 1, wherein each second divalent unit is represented by formula:

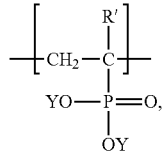

wherein R' is selected from the group consisting of hydrogen and alkyl having from 1 to 4 carbon atoms.

17. The method according to claim 1, wherein each second divalent unit is represented by formula:

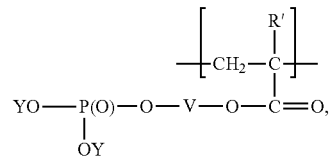

wherein
V is alkylene that is optionally interrupted by at least one ether linkage or amine linkage; and
R' is selected from the group consisting of hydrogen and alkyl having from 1 to 4 carbon atoms.

18. The method according to claim 1, wherein Rf and Rf' are each independently $C_3F_7O(CF(CF_3)CF_2O)_{n'}CF(CF_3)-$, and wherein n' has an average value in a range from 4 to 7.

19. The method according to claim 1, further comprising contacting the hydrocarbon-bearing formation with a fluid before contacting the hydrocarbon-bearing formation with the composition, wherein the fluid at least one of at least partially solubilizes or partially displaces at least one of the brine or liquid hydrocarbons in the hydrocarbon-bearing formation.

20. The method according to claim 1, wherein the hydrocarbon-bearing formation is penetrated by a wellbore, and wherein a region near the wellbore is contacted with the composition.

* * * * *